A. E. COOK & T. VAN TUYL.
COMBINED LAND AND WATER VEHICLE OR CRAFT.
APPLICATION FILED OCT. 31, 1910.
1,180,013.
Patented Apr. 18, 1916.
15 SHEETS—SHEET 13.
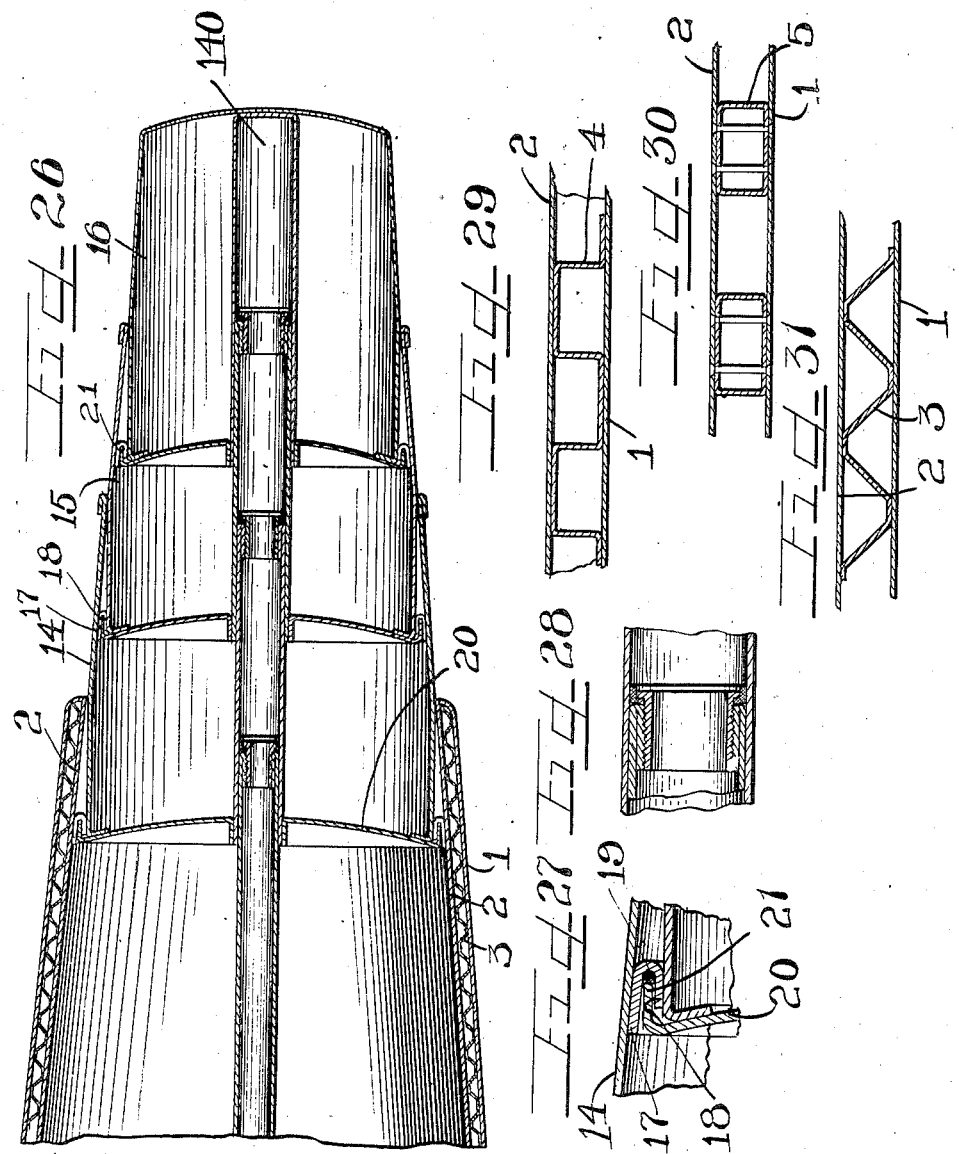

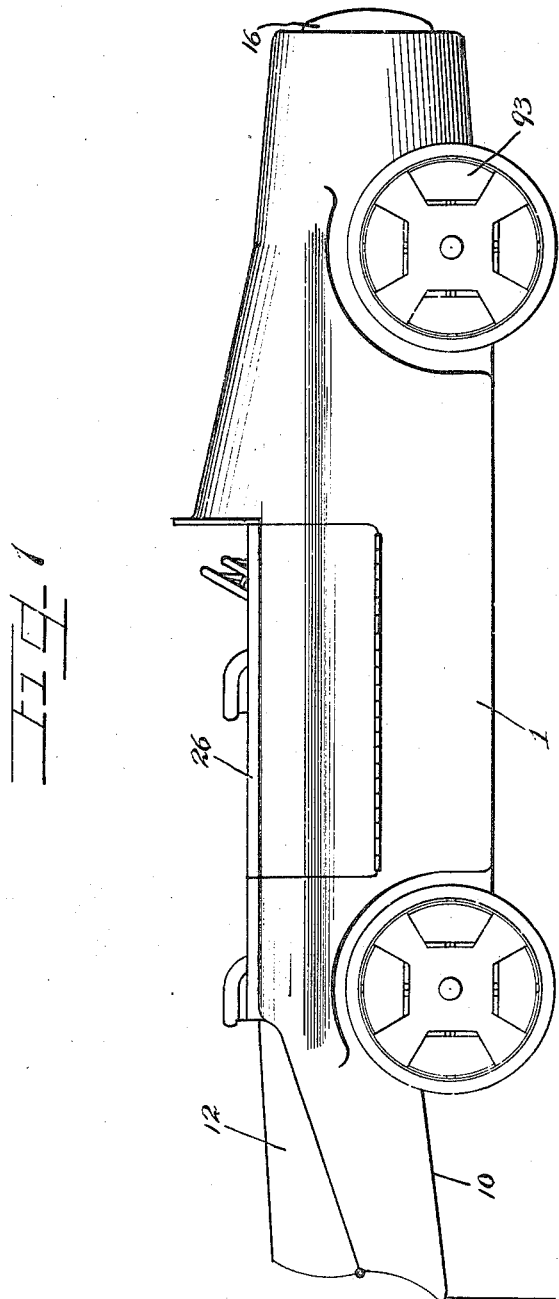

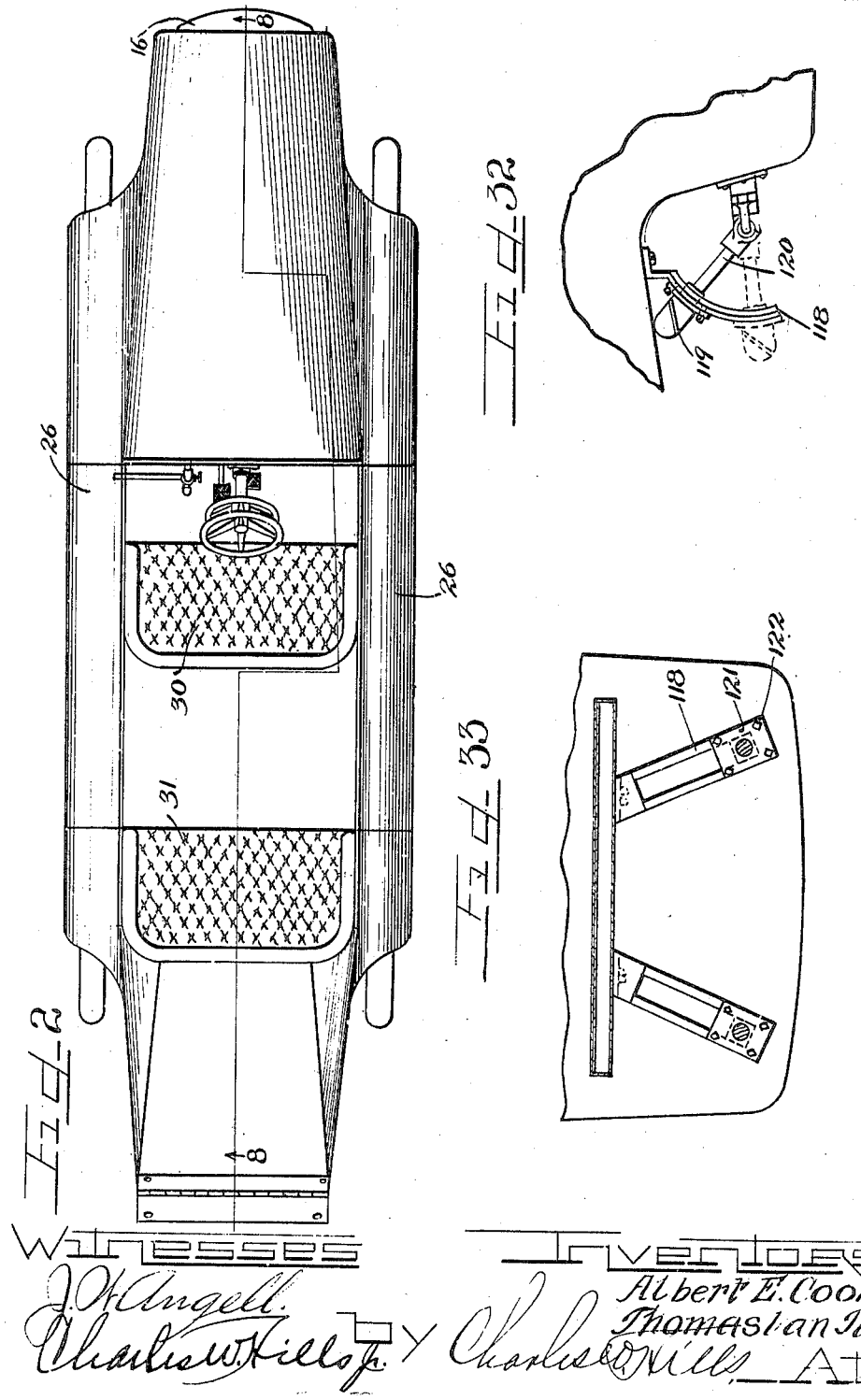

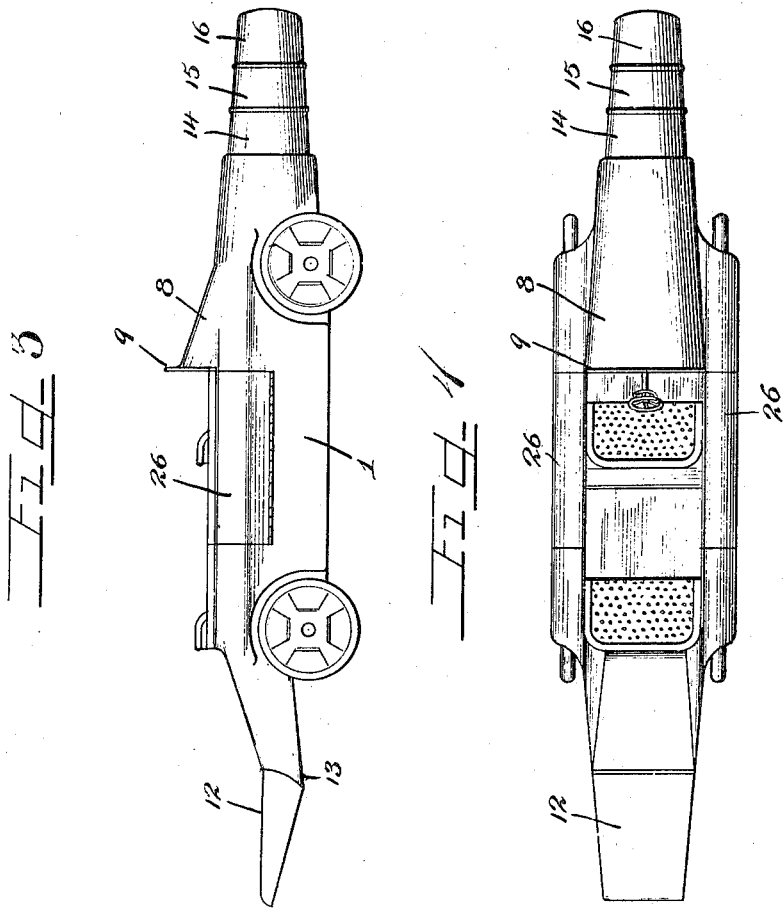

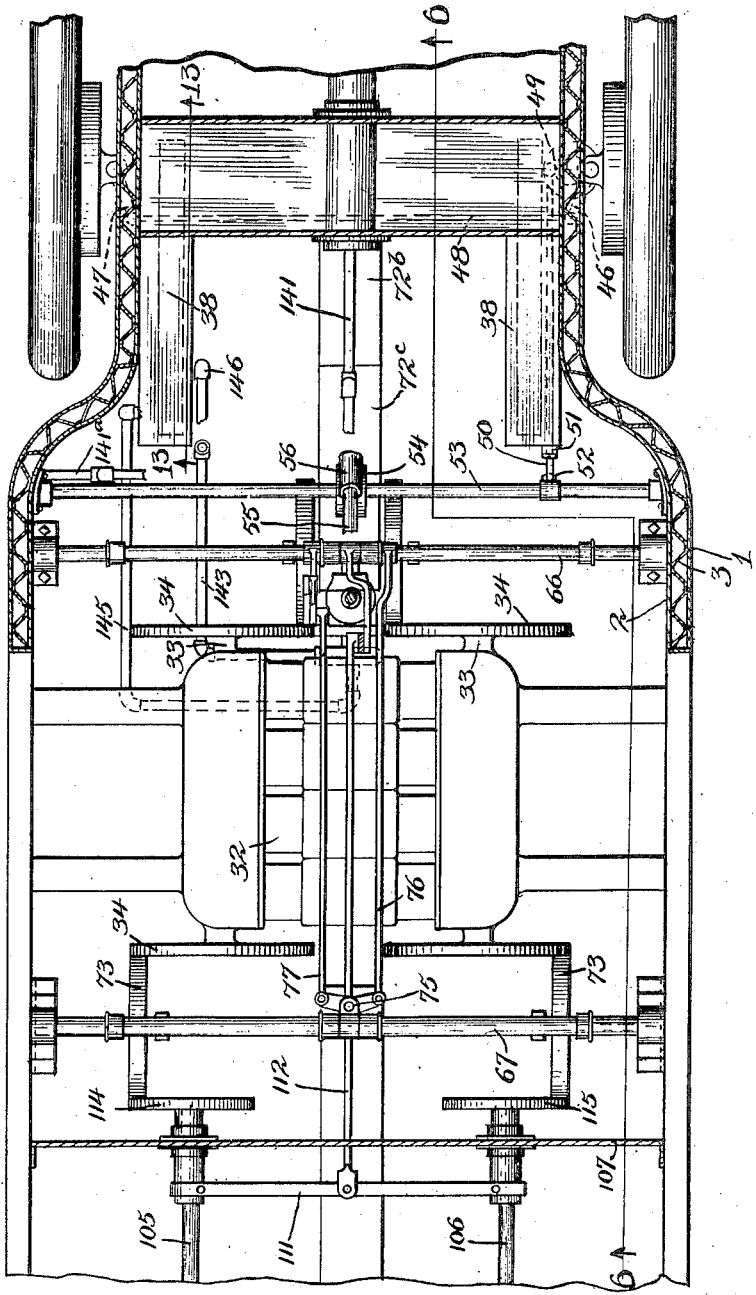

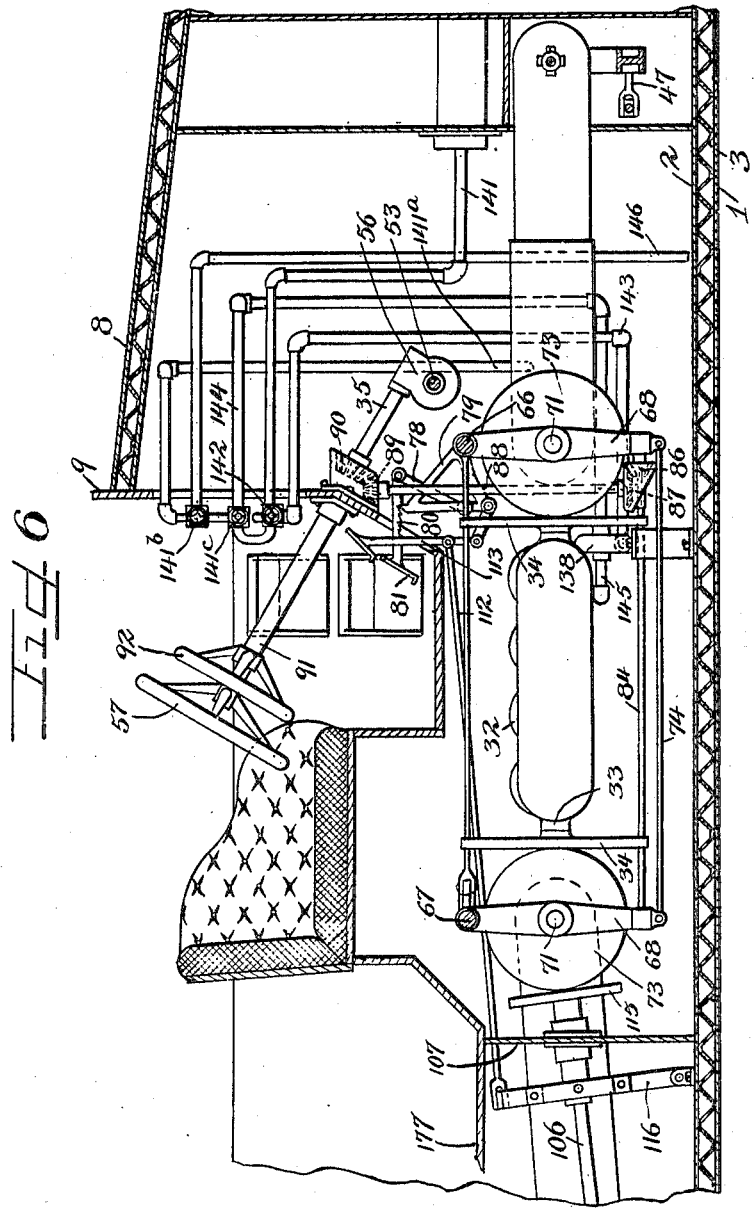

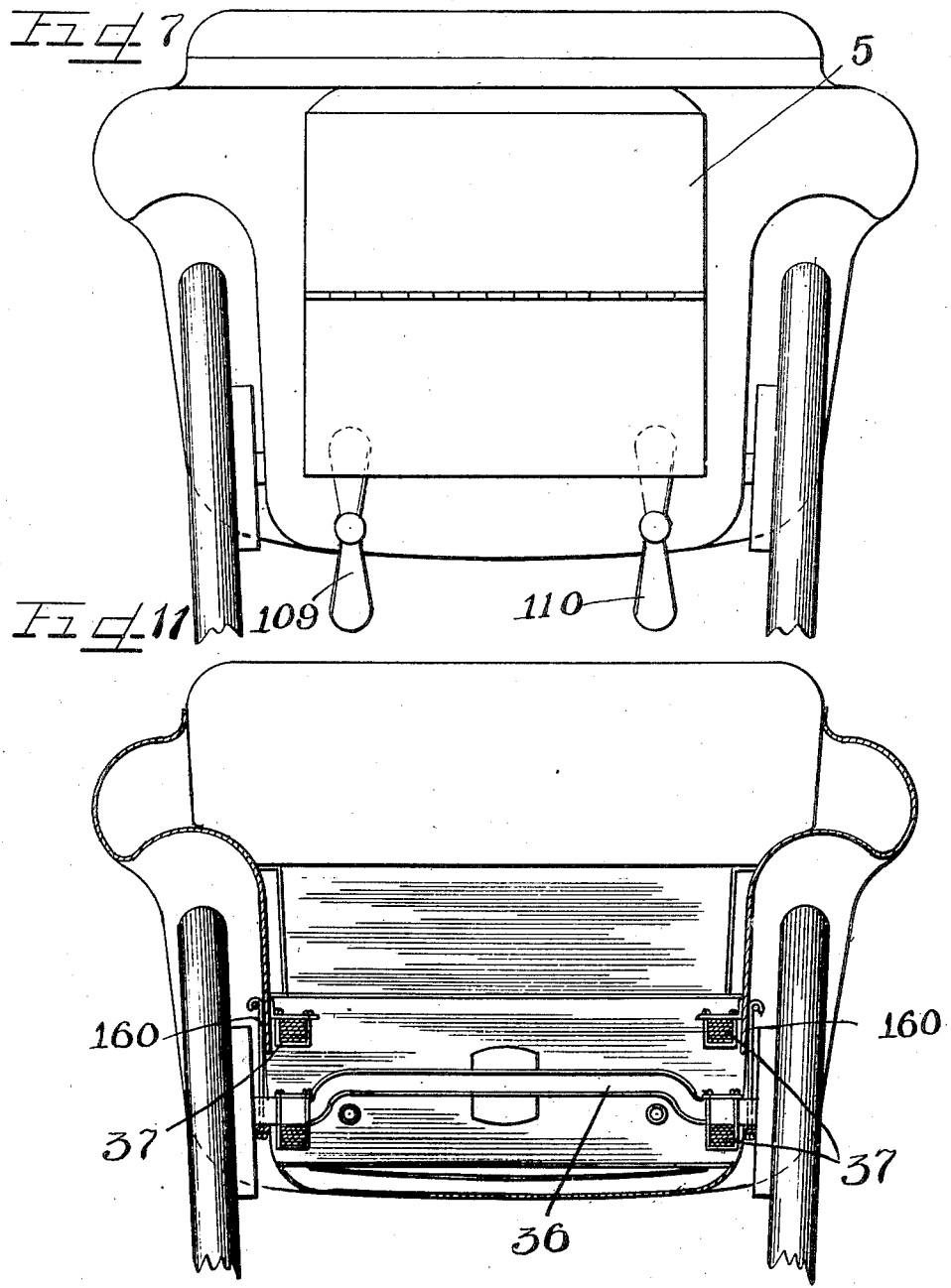

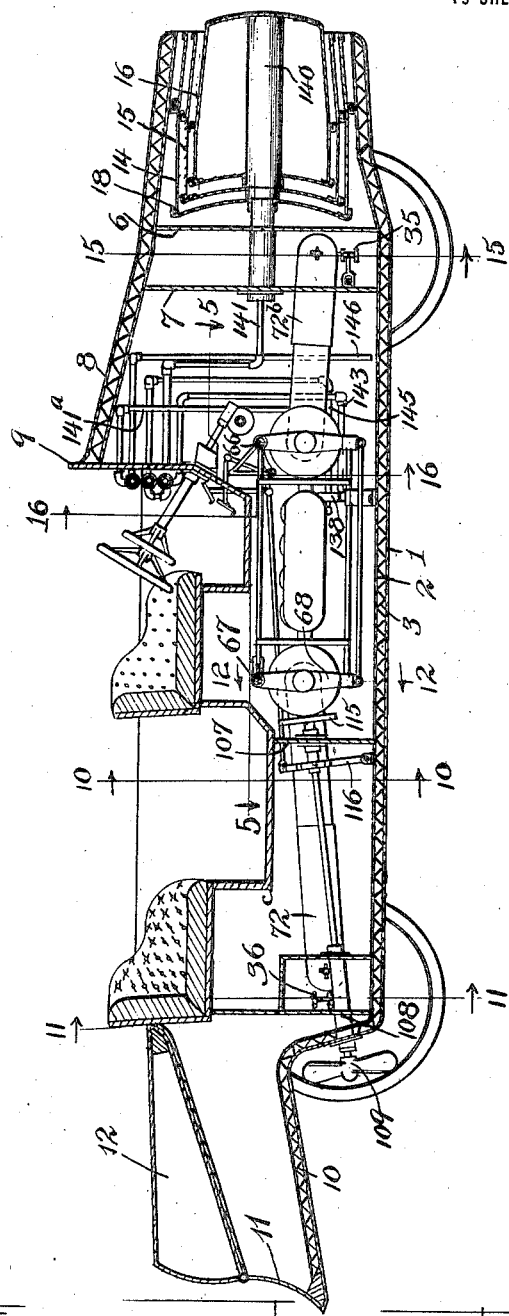

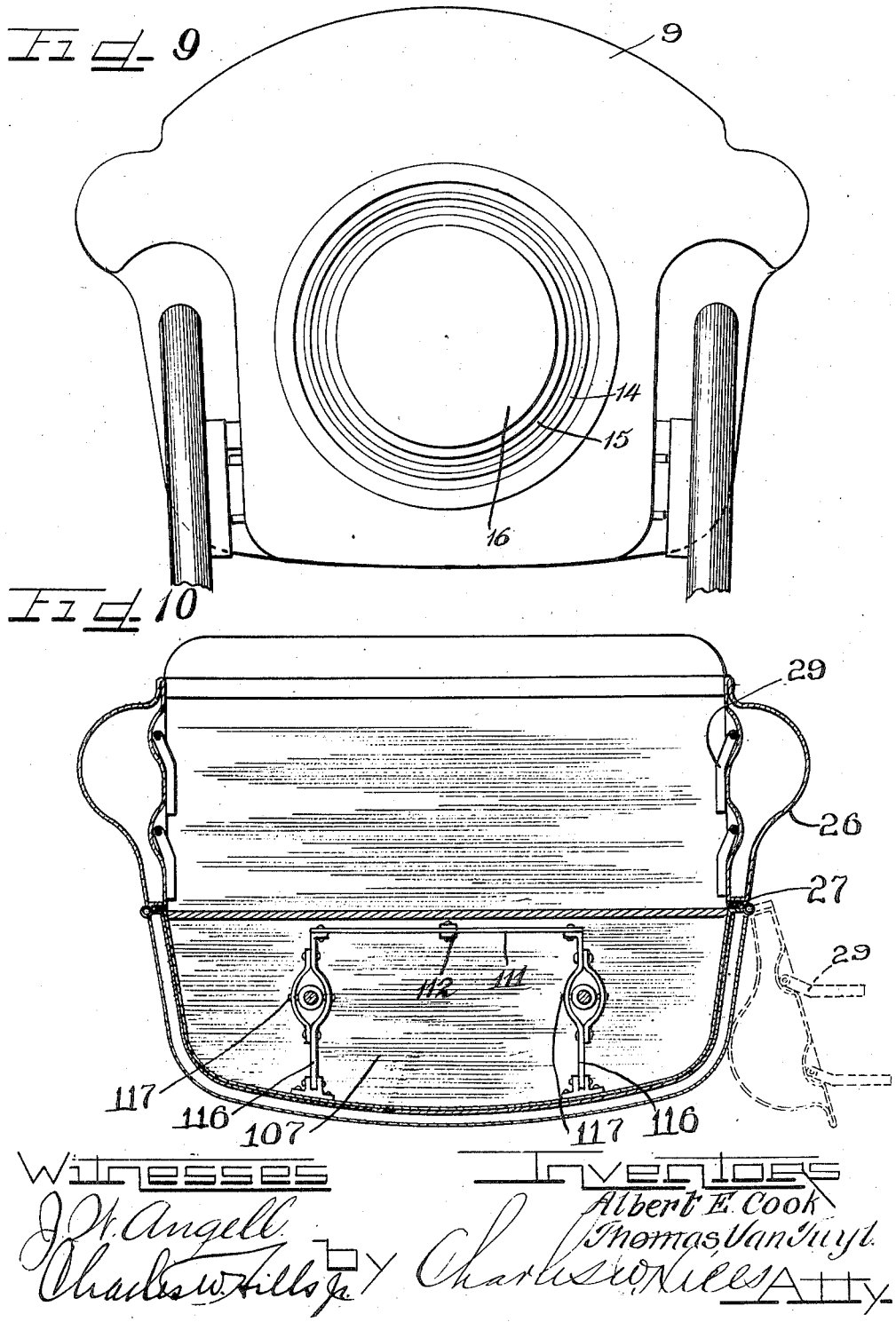

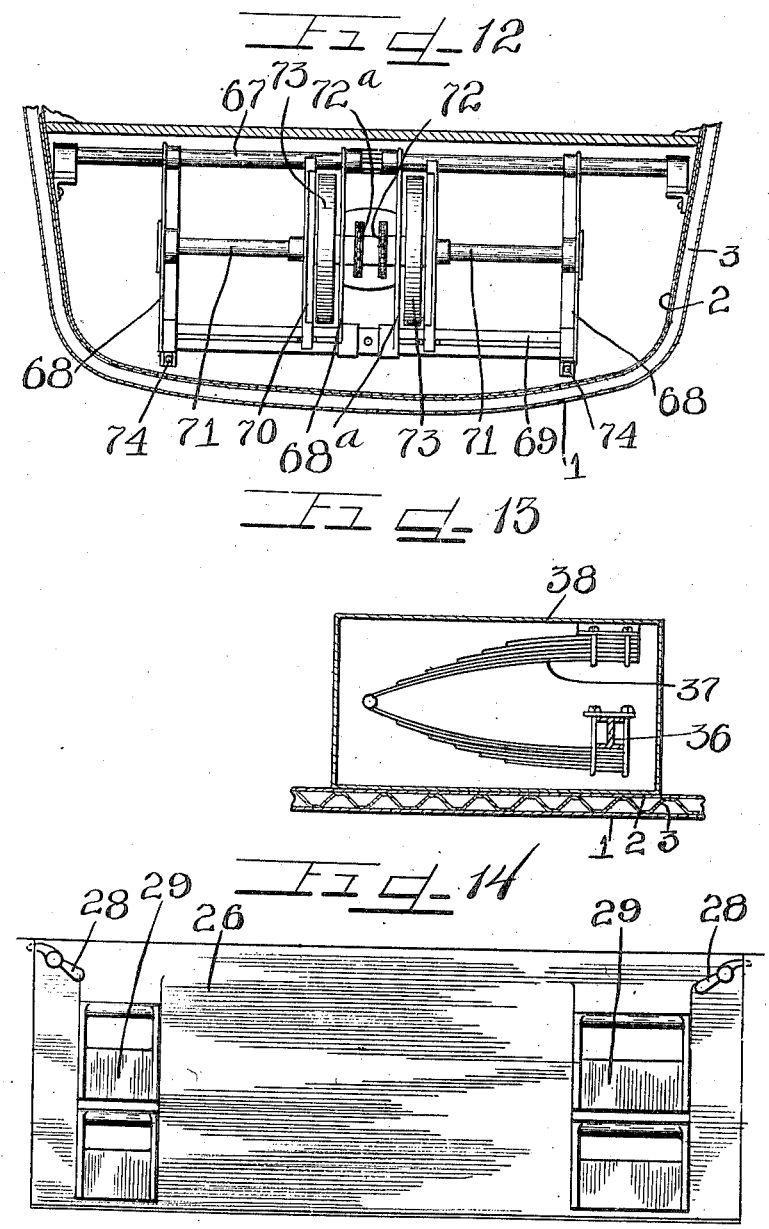

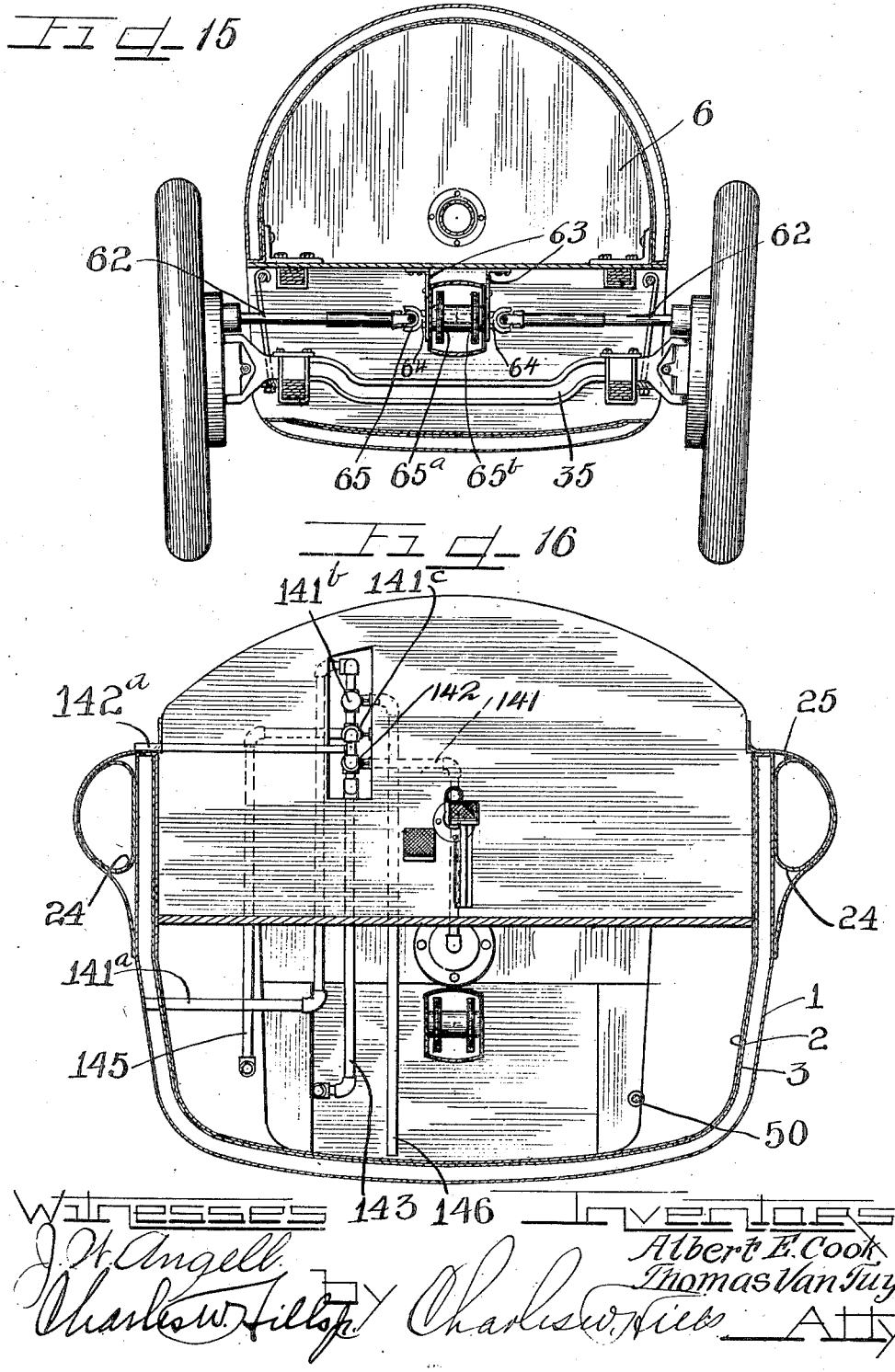

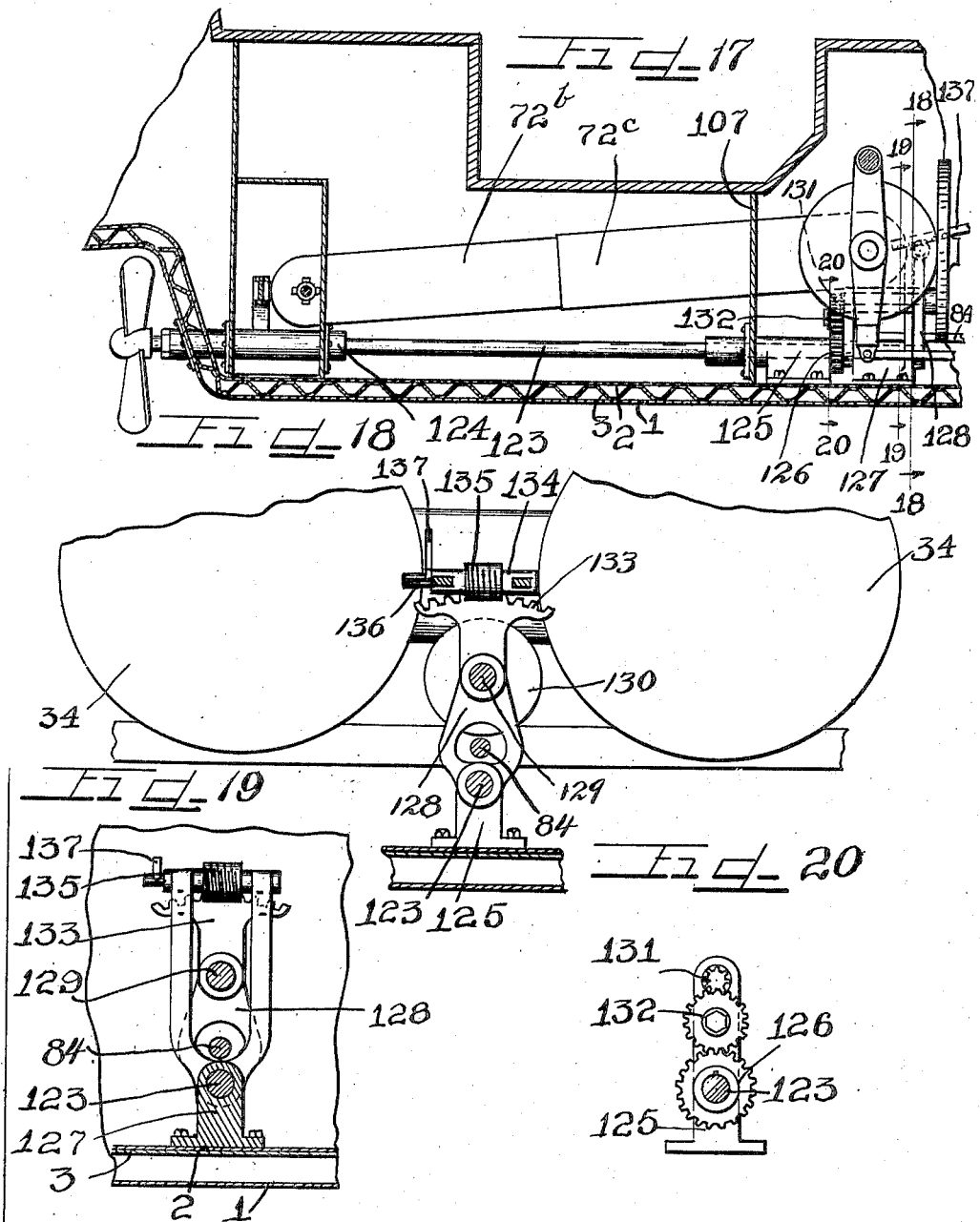

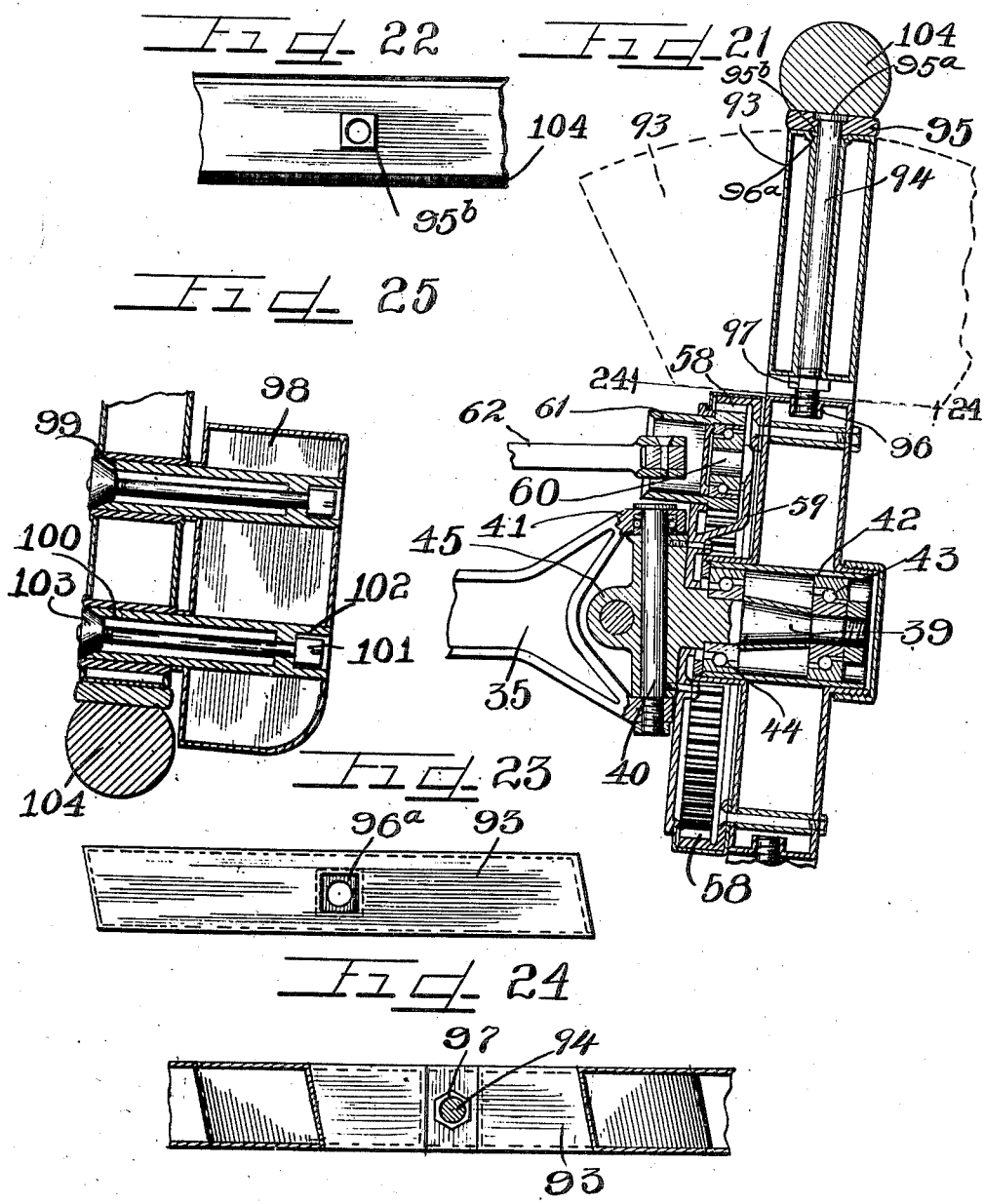

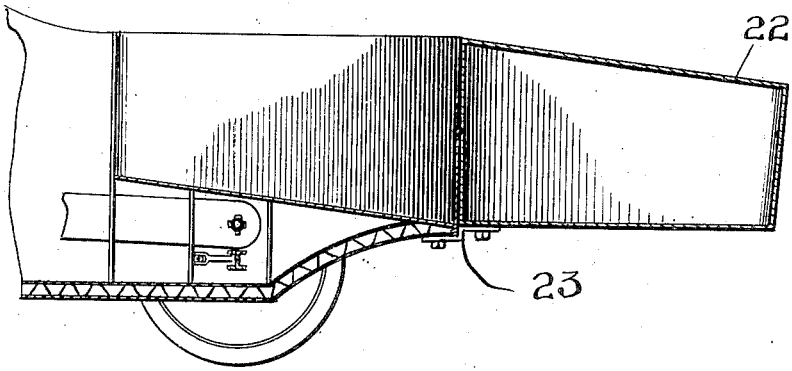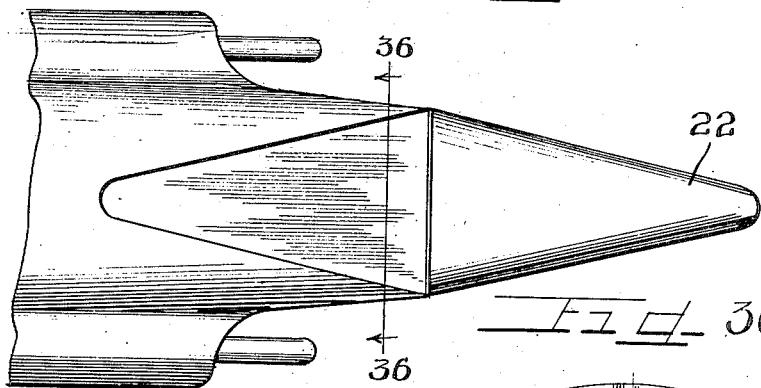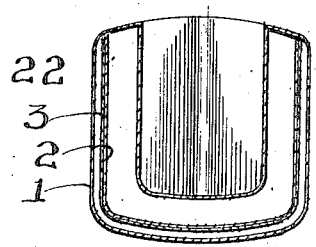

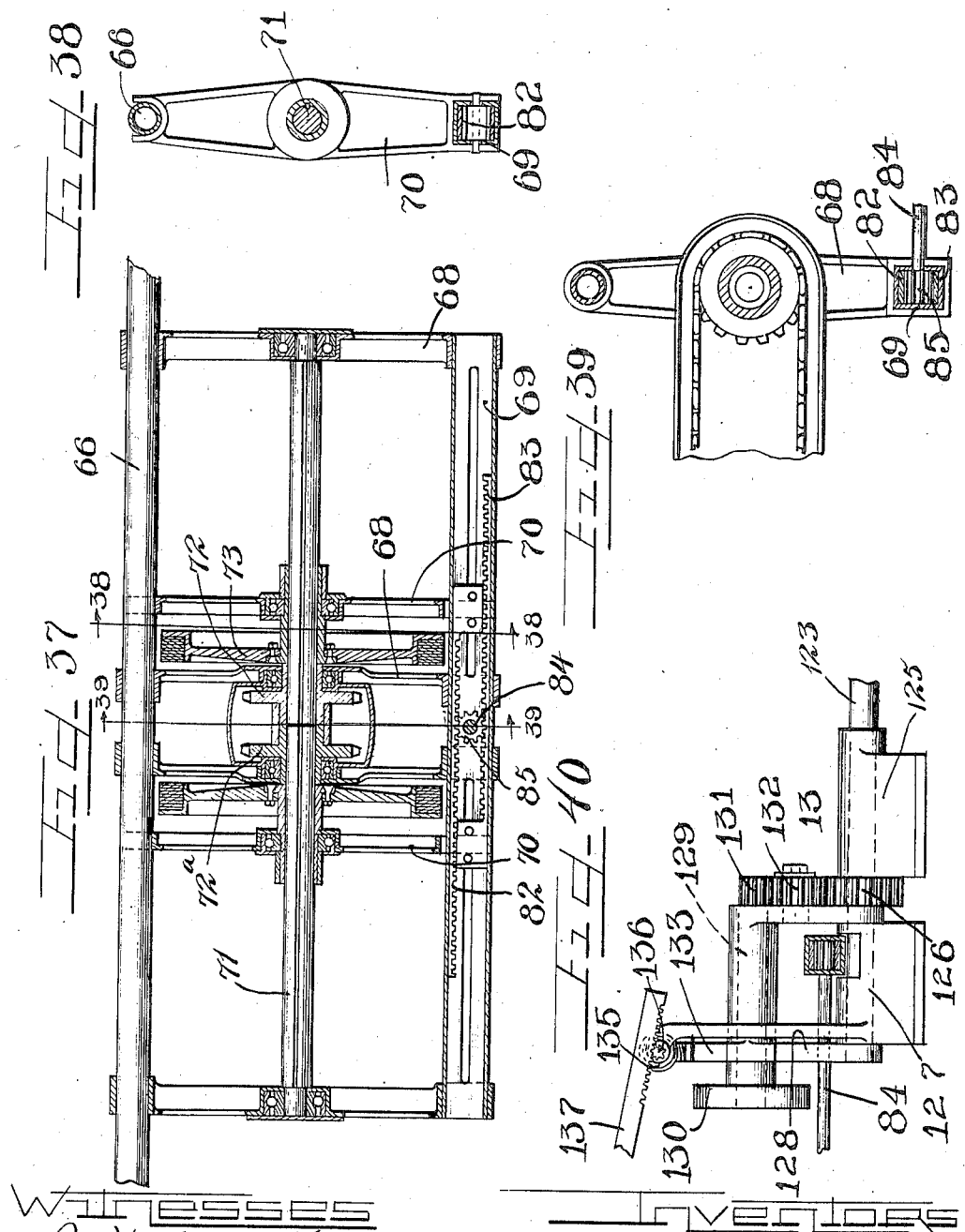

UNITED STATES PATENT OFFICE.

ALBERT E. COOK, OF ODEBOLT, IOWA, AND THOMAS VAN TUYL, OF KANKAKEE, ILLINOIS; SAID VAN TUYL ASSIGNOR TO SAID COOK.

COMBINED LAND AND WATER VEHICLE OR CRAFT.

1,180,013.      Specification of Letters Patent.      Patented Apr. 18, 1916.

Application filed October 31, 1910. Serial No. 589,888.

*To all whom it may concern:*

Be it known that we, ALBERT E. COOK and THOMAS VAN TUYL, citizens of the United States, and residents of the city of Odebolt, county of Sac, and State of Iowa, and Kankakee, county of Kankakee, and State of Illinois, respectively, have invented certain new and useful Improvements in Combined Land and Water Vehicles or Craft; and we do hereby declare that the following is a full, clear, and exact description of the same, reference being had to the accompanying drawings, and to the numbers of reference marked thereon, which form a part of this specification.

Large numbers of automobiles of various kinds and types are now in use for almost every variety of purpose and use, including pleasure vehicles, trucks, and the like, for which good roads are a necessity and the usefulness of which, whether for pleasure or for commerce is largely dependent upon and limited to the character of the roadway. Little progress has, however, been made either for pleasure or for military use in the development and construction of a motor vehicle capable of operation in situations where good roads do not exist or in the wilderness where unbridged lakes and rivers are found which must be crossed to avoid long detours. True, in a few instances, as feats of extreme hardihood and daring, automobiles have been driven for shorter or longer distances through the more sparsely inhabited parts of the world and through regions where good roads are hardly found. These are instances, however, of extreme hardihood on the part of the operator and have not been followed as a rule by the use of the same or a similar car in similar excursions. To the huntsman, and others who seek the wilds, the automobile as heretofore constructed is worse than useless. This is also unquestionably true of the automobile for military uses except in regions where satisfactory roads can be found.

The object of this invention is to provide an automobile adapted for use in the wilderness and capable of satisfactory use in regions where unbridged streams and lakes abound, and so constructed as to permit the automobile to be operated on land and over surfaces upon which the ordinary automobile would be unable to travel.

It is also an object of the invention to afford an automobile adapted for the use of hunters and others in regions remote from good roads and to operate either upon the land or in the water with equal facility.

It is a further object of the invention to afford a combined automobile and boat of the class described, so constructed as to permit the length of the vehicle to be readily increased for water use.

It is a further object of the invention to afford an automobile boat provided with air compartments at one or both ends thereof and adapted to be extended to increase the length of the vehicle when in the water.

It is further an object of the invention to provide an automobile having extensible end sections affording air compartments and acting to increase the buoyancy when the vehicle is used as a boat.

It is a further object of the invention to afford a cellular structure for the main body or hull, so constructed as to afford a double sheathing or lining at the bottom and sides of the hull or body, having air chambers therebetween, said cellular structure or air chambers acting to increase buoyancy when in the water.

Another important object of our invention is to provide wheels for the vehicle so constructed as to insure proper propulsion in mud or other soft material and also to afford propelling and steering means when the craft is on the water, and also to afford in connection with such wheels, a propeller capable of being driven simultaneously with the wheels or independently thereof.

A further and important object of the invention is to provide a construction in which all the weight of mechanism and machinery is carried low down in the hull to insure a low center of gravity when afloat, and to provide an engine or motor in connection with such a vehicle whereby the wheels of said vehicle may all be driven independently or simultaneously, as preferred, thus affording a four wheel drive.

The invention also has for its object a construction affording an exceedingly strong and simple driving and transmission mechanism whereby an independent drive is assured for each wheel of the automobile or vehicle.

Another object of the invention is to afford a pump adapted for use either as a bilge pump when afloat or for hydrostatically extending and holding the end sections of the vehicle extended.

It is a further object of the invention to afford an exceedingly powerful, yet simple, driving connection with the vehicle wheels whereby a positive drive is assured at all times and in which a differential gear as such, is not used.

It is also an important object to afford air chambers, one or more on each side of the vehicle, which serve as mud guards or fenders when in use upon the land, and serve as air chambers or air or gas reservoirs when on the water, and also to afford in one or both sides of the boat a downwardly folding section to permit ready entrance or exit from the boat or automobile and to provide steps on said folding sections which swing downwardly when the section is swung to open position and which fall closed by gravity when said side section is turned upwardly to close the side of the car or vehicle.

The numerous other objects of said invention will be hereinafter more fully set forth.

The invention consists in the matters hereinafter described and more fully set forth and defined in the appended claims.

In the drawings: Figure 1 is a side elevation of a device embodying our invention. Fig. 2 is a top plan view thereof. Fig. 3 is a reduced side elevation similar to Fig. 1, but with the end sections extended as when used as a boat. Fig. 4 is a top plan view of the same. Fig. 5 is an enlarged fragmentary plan view partly in section and with the floor removed, to show the engine and driving connections on line 5—5 of Fig. 8. Fig. 6 is a section on line 6—6 of Fig. 5. Fig. 7 is an enlarged rear elevation showing the extensible portion of the body retracted. Fig. 8 is a section taken on line 8—8 of Fig. 2. Fig. 9 is an enlarged front elevation of the same. Fig. 10 is an enlarged section on line 10—10 of Fig. 8. Fig. 11 is an enlarged section on line 11—11 of Fig. 8. Fig. 12 is an enlarged fragmentary section on line 12—12 of Fig. 8. Fig. 13 is a section on line 13—13 of Fig. 5 and showing one of the front springs in elevation. Fig. 14 is an enlarged view in elevation of the downfolding side sections and steps thereon. Fig. 15 is an enlarged section on line 15—15 of Fig. 8. Fig. 16 is an enlarged section on line 16—16 of Fig. 8. Fig. 17 is an enlarged fragmentary vertical section showing a single propeller installation. Fig. 18 is a fragmentary section on line 18—18 of Fig. 17. Fig. 19 is a fragmentary section on line 19—19 of Fig. 17. Fig. 20 is a section taken on line 20—20 of Fig. 17. Fig. 21 is an enlarged fragmentary vertical section taken through one of the automobile wheels and the driving connections therefor. Fig. 22, is a fragmentary view of the inner face of the rim of the wheel shown in Fig. 21, and illustrates a rectangular boss adapted to lock a propelling blade in adjusted position. Fig. 23, is a top plan view of a propeller blade and illustrates a rectangular recess adapted to receive a corresponding rectangular projection upon the rim so that the blade may be locked in adjusted position. Fig. 24 is a section on line 24—24 of Fig. 21. Fig. 25 is a fragmentary section of a wheel, showing the same equipped with removable propelling blades only on one side thereof. Fig. 26 is an enlarged sectional view illustrating one construction permitting the length of the body to be varied. Fig. 27 is an enlarged fragmentary detailed section illustrating the construction of the water-tight joints between sections, as shown in Fig. 26. Fig. 28 is an enlarged sectional view of one of the joints in the sectional telescoping pressure pipe for actuating the extensible sections shown in Fig. 26. Fig. 29 is an enlarged detail section illustrating the construction of the double hull and the reinforcing ribs affording air chambers therebetween. Fig. 30 is a similar section in which the ribs are tubular. Fig. 31 is a similar view of a slightly modified reinforcement between the inner and outer sheathing of the body. Fig. 32 is a fragmentary side elevation illustrating the means for supporting the propeller in the twin screw type of the device. Fig. 33 is a fragmentary rear elevation partly in section of the outboard bearings for the twin screw propellers. Fig. 34 is a fragmentary central longitudinal section illustrating a hinged and inwardly folding extension member. Fig. 35 is a top plan view of the same. Fig. 36 is a section on line 36—36 of Fig. 35. Fig. 37 is an enlarged sectional view of the shifting mechanism for the front driving transmission. Fig. 38 is a section on line 38—38 of Fig. 37. Fig. 39 is a section on line 39—39 of Fig. 37. Fig. 40 is an enlarged side elevation of the shifting mechanism for the single screw.

As shown in the drawings, said invention includes an automobile body or hull of the torpedo type, front and rear extensible sections affording air chambers, laterally disposed air chambers affording mud guards and increasing lateral stability when afloat, wheels for driving the vehicle upon the land and constructed to propel in mud or water, a motor positioned centrally and substantially below the load water line when afloat, independent driving connections to each of said wheels, a propeller or propellers for use independently of the wheels when afloat, a central disposed steering and controlling mechanism, a pump connected for service as a bilge pump and also should it be required to hydraulically or pneumatically operate some of the extensible sections.

The body or hull proper is constructed of pressed sheet metal to afford an outer sheathing or skin 1, which may be constructed in any suitable sections and united substantially integrally by electric welding or by riveting to afford a watertight hull or body, within which is fitted an inner skin or sheathing or lining 2, conforming thereto and spaced therefrom and united therewith by means of an inner reinforcing lining 3, which may be corrugated sheet metal, as shown in Figs. 5, 6, 17 and 26, of the drawings, the corrugations of which extend around said body transversely to afford closely arranged strengthening ribs, and a multiplicity of independent air chambers around the bottom and sides of the body and extending also around what may be termed the hood or forward deck of a boat.

The outer and inner sheathing and the inner reinforcing corrugated lining are all rigidly united together to afford practically a unitary structure of cellular type. These corrugations may be in the form indicated in the figures before referred to, including Fig. 31, that is to say, with V shaped corrugations, or as shown in Fig. 29, in which the corrugated sheet 4, is bent successively at a right angle or if preferred, ribs 5, comprising flattened tubes may be rigidly secured by riveting or otherwise between the outer and inner skin or sheathing, as shown in Fig. 30. The constructions mentioned enable the external and internal sheathing of the body to be made extremely light and at the same time afford great strength and buoyancy and also efficient protection from puncturing and consequent leaking when afloat.

Both the inner and outer sheathing, or skin and the internal lining or reinforcement, are constructed of any suitable tough and strong sheet metal or alloy possessing great tensile strength and preferably of a material such as a bronze alloy or aluminum alloy which will not require painting. Said body is shaped at its front to afford a substantially circular hood end around which said reinforcement may extend, as shown in Fig. 8, and from a point in advance of, and also at the rear of the front axle are sheet metal bulkheads 6 and 7, and from a point intermediate said bulkheads the top of said body extends upwardly and rearwardly to afford a turtleback deck 8, which extends to a dash 9, or combing, which extends above the same sufficiently to protect the occupants of the body or hull from spray or wash.

The rear end of the body or hull may be substantially as before described with reference to the front end but conveniently and at the rear of the rear axle, the body inclines upwardly at the bottom and rearwardly, then slightly downwardly to afford a substantially flat floor 10, at the rear of the propelling means and at a point at the rear of the rear axle is provided a transverse bulkhead 11, thus affording an after air compartment of large capacity.

In the construction shown in Figs. 1, 2, 3, 4, 7 and 8, the top or upper wall of said after air chamber extends obliquely downward. Hinged at the rear extremity thereof is a folding section 12, comprising a sheet metal air chamber which may be reinforced in any suitable manner and is of a length when folded inwardly to close against the rear seat in the body to afford a symmetrical rear end for the automobile, but which, when extended, as shown in Figs. 3 and 4, affords a rear extension air chamber having a flat under surface and shaped to afford a floor to prevent the stern or rear end of the hull from settling when running at speed in the water. Any suitable means may be provided for securing said rear extension 12, in extended position. For this purpose bolts may be used, if desired, which extend through the rear lower angle of the rear air chamber at the rear end of the body, and engage in the wall of the rear extension air chamber when in extended position. One of said bolts 13, is shown in Fig. 3, though any other suitable means for securing said extension air chamber in position may be employed. Telescoping in the otherwise open front end of the body and in the compartment of the bulkhead 6, are telescoping sections 14, 15, and 16, each of which is circular in cross section and slightly tapered. These nest together within the forward end or hood end of the body and afford, when extended, as shown in Figs. 3, 4, and 26, a succession of air and watertight compartments which greatly extend the length of the body and increase buoyancy and stability of the craft when used in the water. A tight joint is provided at the rear end of each of said sections with the next succeeding rear section or with the body. For this purpose, as shown in Figs. 8, 26 and 27, an annular band is secured around each of said air chambers 14 and 15, on the inner side thereof and near the middle of the same and likewise in the inner lining 2, of the open ended hood. The forward edge of said annular band is turned inwardly and rearwardly to afford a rearwardly directed flange 17, and in the annular pocket thus formed is provided a packing 19, of rubber or any suitable material. Rigidly secured on the rear end of each of said sections is a forwardly dished or concave head 20, the periphery of which projects beyond the walls of the section, as shown in Figs. 26 and 27, and is bent forwardly to afford a flange 21, which fits into said recess back of the flange 18, and bears against the packing ring 19, thereby affording a water and air tight seal. Any suitable means may be provided for drawing or forcing said sections outwardly. In the construction shown in Figs. 8 and 26, hydraulic or pneumatic means are employed as hereinafter described, though conveniently said extension sections may be constructed for independent removal from the open end of the body, and secured in extended position in any suitable manner, and, of course, any required number of said extension members may be employed to afford the requisite longitudinal extension for speed and comfort.

If desired, and for craft of a smaller size, a folding section similar to that shown in Figs. 34 to 36 inclusive, may be employed, either at the front or the rear end of the automobile or craft. In this construction shown, the end to which said extension is to be secured is provided with a recess in its top complemental with said folding air chamber extension 22, and the outer end wall of said recess or chamber is extended upwardly approximately half the height of the end and is hinged transversely to the rear wall of said air chamber at its middle, as shown in Fig. 34. Said air chamber 22, may, of course, be of any suitable shape and may be relatively broad if used at the stern or rear of the device, and, of course, would be suitably shaped for that purpose if used at the bow or front end of the device. As shown in Figs. 34 and 35, said extension air chamber is shown secured at the front end of the vehicle and is consequently shaped suitably for that purpose. When not in use upon the water, it is folded back into the recess in the end of the automobile body and when extended may be secured in place by any locking means suitable for the purpose. Said extension or chamber is rigidly secured in its extended position by means of a bracket or strap 23, which is bolted to the under or inner side thereof and to the under side or end of the automobile body, as shown in Fig. 34. When in use in extended position upon the water, any suitable covering device may be employed to close the recess therefor in the automobile body to prevent access of spray or water thereto. Other constructions for extending the length of the body when going into the water, will readily suggest themselves.

Laterally disposed air chambers 24 extend longitudinally of the vehicle body and over the wheels and serve at their ends as mud guards when the vehicle is upon land, and serve to insure great lateral stability when afloat. These air chambers also serve a very important purpose in affording storage tanks for air or gas under high pressure to be used for any purpose required, among which may be considered the starting of the engine or motor, the giving of signals, and any of the numerous uses likely to arise. As shown, the body of the vehicle at each end and below the ends of said air chamber or mud guards, is recessed to receive the wheels, and extending upwardly and outwardly therefrom the outer sheathing or skin of the body affords attachment for an outwardly and downwardly directed plate 25, the edges of which are riveted, welded, brazed or otherwise secured to the wall of the body to afford air chambers, adapted, if preferred, to inclose the chambers 24, therein, as shown in Fig. 16.

As shown, a downwardly folding section 26, affording access to the operating seats and tonneau or rear seats of the body, is hinged to the body at a point not far from the load water line when afloat, and fits closely therein, as shown in Figs. 1 to 4 inclusive. As shown, a continuous hinge is afforded along the meeting edges of said hinged section 26, and the automobile body, and a recess 27, is provided on the inner side of, and along said hinge to receive any suitable resilient packing such as rubber, the compression of which, when said hinged section is secured in closed position, prevents leaking along the hinge, and also, of course, similar or any suitable packing material is provided between the ends of said hinged section and the body to prevent leaking around the ends of said hinged section as well as at the bottom. These are not shown at the ends to avoid confusion. This construction provides six independent and individual air chambers, one at each end of the body and two on each side thereof, and one in each of said hinged sections. The three lateral chambers on each side of the body, however, afford a succession of practically continuous air chambers on each side of the body which may be normally above load water line, or the central chamber may be at load water line. These lateral chambers act to greatly extend the width of the body and to prevent rolling, capsizing or sinking. Said six air chambers so described and the permanently inclosed air chambers in the bow and stern of the craft are sufficient in capacity in themselves to insure flotation with full equipment and passengers even should the craft fill when afloat.

As shown in Fig. 14, a latch 28, is provided on the inner side at each end of and near the upper edge of each hinged section to engage and lock the same in closed position. Pivotally engaged on the inner side of said hinged section 26, as shown in Figs. 6 and 10, are steps, two series of the same being shown at opposite ends thereof to permit the passengers to enter to the seats when said side sections are folded outwardly and downwardly. Said steps 29, are pivotally engaged on the inner side of said hinged section and fall by gravity to supporting position to afford substantially horizontal surfaces when the hinged section is turned down. Within the body of the vehicle, a relatively broad front operating seat 30, and rear seat 31, extend transversely the car or boat. For the purpose of positioning the center of gravity of the car and boat as low as possible and to correctly balance the boat when in the water, either with the end sections extended or when retracted, the engine or motor 32, shown, is positioned centrally and in the bottom of the body, and is of a multiple cylinder, horizontal center fire type; that is to say, said engine or motor comprises connected cylinders, each having a crank shaft 23, journaled at the outer ends of the cylinder in crank cases. The engine is of a type in which the pair of pistons in each individual cylinder reciprocates at all times oppositely and in which the impulse is afforded by compressing and firing the charge at approximately the middle of the cylinder and between the pistons, thus driving the pistons outwardly in the cylinders and driving each of the shafts 33, simultaneously and equally thereby and in the same direction. Secured on each end of each of said crank shafts is a driving friction wheel 34, as shown, with the driving faces thereof directed toward the ends of the body. These also, of course, serve as balance wheels, and inasmuch as they are four in number, may be made comparatively light without detracting from their value as balance wheels, inasmuch as the four collectively need not weigh much more than the single balance wheel ordinarily used on such engines or motors. This construction and arrangement permits each of the automobile wheels to be driven independently, as will hereinafter be more fully explained.

Near the front end of the body, and between the bulkheads 6 and 7, is afforded a compartment through which extends the front axle 35, and a corresponding transverse compartment near the rear end of the body is provided with a rear axle 36. The body is supported on said axles 35 and 36, by means of strong half elliptical springs 37, which extend longitudinally the body in the compartment therefor, as shown in Fig. 13, for the front springs, which consist of a sheet metal casing 38, inclosing the rearwardly directed ends of the springs, and opening into the axle compartment between the bulkheads 6 and 7. The upper leaves of said springs are secured above the axle to the walls of said chamber and to the body, as shown in Fig. 13, or in any suitable manner to support the weight of the body on said axle. Said springs may, of course, if desired be coil springs instead of elliptical or half elliptical springs, in which event, of course, the lower ends of the coil spring will be supported on the axle, and the body supported on the upper end thereof, and of course, any suitable type of springs may be employed and secured in any suitable manner in the axle compartment. The object to be attained is, of course, to absorb all shock due to inequalities in the road and without necessitating any opening through the bulkheads to permit leakage into the body of the vehicle.

The wheel stubs 39, are journaled to swing horizontally on the pivot bolts 40, which extend vertically through the yoke ends 41, of the front axle 35. The front automobile wheels are, as shown, of metallic construction, though, of course, not necessarily so, and are provided with a central hub 42, having a relatively large internal diameter and in which are any suitable ball, roller or other anti-friction bearings 43—44, as shown in Fig. 21, whereby said wheel is journaled on the spindle or stub 39.

Each of the spindles on the front axle is integral with the steering knuckle 45, as shown in Fig. 1, from which, and extending rearwardly therefrom, as shown in Fig. 5, one arm 46, of the steering knuckle is connected with a corresponding arm 47, on the steering knuckle for the opposite wheel by means of the rod 48, all shown in dotted lines in Fig. 5. The other arm of said steering knuckle 49, projects transversely of the body and is engaged by means of a rod 50, which extends through the spring compartment 38, as shown in dotted lines in Fig. 5, and is provided with a gland 51, to prevent leakage. The rear end of said rod is engaged on a steering arm 52, secured on a shaft 53, journaled transversely of the body, as shown in Figs. 5 and 6, with which is connected any suitable mechanism for rotating said shaft 53. For example, a worm gear may be rigidly secured on the shaft 53, and a worm secured on the steering staff 55, meshing therewith, all of which of whatsoever construction is inclosed within the usual casing or shell 56, as is usual, and the details of which for convenience are not shown inasmuch as any of the familiar mechanisms for the purpose may be used. Said steering staff, and thereby the staff 53, to turn the wheels out of their plane, are rotated by the steering wheel 57, on the extremity of said steering staff 55, as shown in Fig. 6. Said front wheels are driven internally. For this purpose, as shown, an annular internally geared rim 58, is bolted or otherwise rigidly secured concentric with the hub on the inner side the wheel and a bracket 59, is bolted or rigidly secured on the knuckle to extend upwardly and within said rim, and is provided with a stud 60, rigidly secured thereon and projecting inwardly. Secured on said stud by means of ball bearings is a coupling 61, provided with a geared rim 62, which meshes with the inwardly directed teeth on the rim 58. Said coupling for each front wheel is open at its inner end or that directed inwardly of the body, and driving slip shafts 62, are connected therewith by means to afford a universal joint, as shown in Figs. 15 and 21. Brackets 63, are secured on the under side of the upper wall of said axle compartment and depend therefrom, and between the same are journaled sprocket wheel shafts 64, with which on opposite sides thereof the inner ends of the shafts 62, are connected by any suitable universal joint coupling 65. Two sprocket wheels 65$^a$, and 65$^b$, are provided on said shafts 64, to drive the respective driving shafts 62, independently or simultaneously, as hereinafter more fully described. Of course, if desired, the brackets on which the differential is supported may be secured centrally of the axle, if preferred. The drive is communicated from the engine to said sprocket wheels 65$^a$—65$^b$, and shaft 62, and thereby the wheels from the front driving friction disks 34. For this purpose, a shaft 66, as shown in Figs. 5, 6 and 8, is journaled transversely of the frame in advance of, and above the motor or engine, and a corresponding shaft 67, at the rear of the motor, is slidably supported parallel therewith in any suitable side bearing in each side of the body. Depending from said shafts 66 and 67, one at each end and one on each side of the center, are equalizing levers or hangers 68, for each shaft. These are connected at their lower ends by transverse tubular bars 69, as shown in Figs. 12, and 37 to 39 inclusive, and slidably supported on said bar and said shafts 66 and 67, respectively, are sliding carriers 70. Journaled in said equalizing levers or hangers 68, and extending through the sliding carriers 70, are independent transmission shafts 71, one for each friction wheel 73, and on the inner end of each of said transmission shafts are central sprocket wheels 72, and 72$^a$, about which are trained sprocket chains which lead to the corresponding sprocket wheels 65$^a$, and 65$^b$, which drive the shaft 62. As shown, telescoping housings or casings 72$^b$, and 72$^c$, inlcose said sprocket wheels and driving chains to protect the same from dirt or moisture and the forward section and the rearward section respectively of said casings or that extending through the front bulkheads 7, and the corresponding rear bulkheads are connected therewith to afford a tight joint to prevent leakage and any suitable packing is provided, where said casings receive the shafts therethrough to said axle compartments.

Friction wheels 73, one on each side of the sprocket wheels 72, are splined on the shafts 71, and the carrier bars or frames 70, are respectively secured by means of ball bearings on the hubs of said friction wheels 73, in position to engage and to be driven by the front driving disks 34, on the motor, or the corresponding rear driving disks 34, for the rear drive. The lower ends of the equalizing levers or hangers 68, for the front and rear transmission are connected by equalizing rods 74, and centrally engaged on the rear or sliding shaft 67, is a lever 75, one end of which is connected with the shaft 66, near the center thereof by means of a rod 76, and the other end of which is connected by means of a rod 77, with an actuating lever 78, the lower end of which is fulcrumed upon a rigid frame 79 which is secured centrally and rearwardly therefrom. Said lever 78, is pivotally engaged at its upper end by a substantially horizontal actuating rod 80, provided with a foot-piece 81, conveniently positioned to be actuated by the foot of the operator to force the lever 78 and connected mechanism to shift the driven friction wheels into driving engagement with the driving wheel. Ratchet teeth are provided on the under side of said actuating rod 80, adapted to receive and engage therebetween the sharp, angular point on said frame 79, as shown in Fig. 6, and which serves as a detent to hold the actuating lever for the driven friction wheels 73, in driving engagement. Slight upward pressure on the foot-piece 81, of said actuating rod acts to release the same from said detent on the frame, thereby permitting the driven frictions to swing clear from the driving frictions 34.

Means are provided for adjusting the front and rear driven friction wheels 73, simultaneously across the face of the driving friction wheels 34, to drive the vehicle ahead or to reverse the same, and to vary the speed by varying the radial distances of contact of the driven frictions on the driving frictions. For this purpose, as shown, each of the lower frame bars 69, is tubular and may comprise two inwardly facing channels rigidly secured together flange to flange on the hangers or equalizing bars or levers 68. Within the tubular frame bar 69, and between the inwardly faced channel bars forming said lower frame bar, are upper and lower inwardly facing rack bars 82 and 83, rigidly secured to the respective carrying frames or bars 70, by means of bolts extending through longitudinal slots in the webs of the channels forming said lower frame bar. Said rack bars extend from their point of attachment on the carrying bar or frame 70, toward the opposite or remote side of the car, thus overlapping each other. A shaft 84, is journaled in said tubular frame bars 69, on the front and rear equalizing bars or levers, and secured thereon in mesh with both rack bars in each of said frames is a pinion 85, as shown in Fig. 37, and, as shown, said shaft 84, is provided at its forward end with a bevel gear 86 meshing with a corresponding bevel gear 87, on an upwardly directed shaft 88, suitably journaled in operative relation thereto, and on the upper end of which is a bevel pinion 89, meshing with a bevel pinion 90, secured on a sleeve 91, through which the steering staff 55, coaxially extends and on the upper end of which is a hand wheel 92, for rotating the same. The engagement of said shifting frames on said rack bars is such that the rear driven disks are shifted outwardly on the driving disks when the forward driven frictions are shifted inwardly on their driving frictions, so that the driven shaft at all times rotates in the same direction. This is accomplished by reversing the attachment of the shifting frames for the drives on their respective racks. That is to say, the carrying frame or bar 70 for the rear drive, corresponding with the similar shifting bar or frame for the front drive, is attached to the upper rack bar in the rear drive and the corresponding carrying frame for the front drive is attached to the corresponding lower rack bar. This insures an opposite and equal adjustment for the front and rear drive, and inasmuch as each wheel is frictionally driven from an independent jack shaft, no differential as such, is required inasmuch as slight slippage of the driven friction upon the driving friction may be sufficient to compensate in turning corners and otherwise. Of course, if desired, an independent front and rear adjustment may be afforded for the wheels on the right side of the vehicle and the wheels on the left side of the vehicle. This may be accomplished by providing independent gears for the respective racks and a third hand wheel and geared connections therefor on the steering shaft.

The road wheels may be utilized as propelling means when afloat. For this purpose, the wheels are constructed of sheet metal, as shown in Figs. 1, 3 and 21, and are provided at equal distances apart with recesses or openings therethrough extending from the rim inwardly to near the geared driving rim 68, and the sides of which conveniently are substantially in alinement with the radius of the wheel, as shown in Figs. 1 and 3, and secured therein are fins 93, which, when the vehicle is in use upon good roads, may be turned inwardly and secured in place, as shown in Figs. 1 and 3, but upon soft or muddy ground or preparatory to going afloat, may be turned outwardly, as shown in Fig. 21, to form propelling paddles. For this purpose, as shown, each of said fins or paddles is shaped complementally with the recess or compartment therefor in the wheel and is pivotally secured upon an attaching bolt 94, the head of which is provided at its outer end with a head or boss 95$^a$, which is secured in the rim of the wheel 95, and the inner end of which is threaded into a suitable threaded boss 96, set in the wheel at the center of the inner wall of said compartment or recess. A plurality of rectangular bosses 95$^b$, are provided on the inner face of the rim of the wheel, and as shown, they are so located that each of the same will surround one of the bolts 94, in position to project into a corresponding rectangular recess 96$^a$, in the upper face of the adjustable propeller blade or fin adjacent the same to normally hold the propeller blade or fin from rotation. A nut 97, is provided on said bolt at the inner side of said fin, which, when adjusted in one position, acts to hold the fin firmly in place in retracted position in the wheel, but which when slightly released, permits the propeller blade or fin to be lowered slightly to permit disengagement of the rectangular boss 95$^b$, from the recess 96$^a$, so that the fin may be turned at a right angle with its normal position, as indicated in dotted lines in Fig. 21, and when again set up so that the boss 95$^b$, will engage in the recess 96$^a$, to hold the fin firmly in place. Conveniently, the radial side edges of the fins are slightly oblique, as shown in Figs. 23 and 24, and the side walls of the chamber therefor in the wheel are complementally shaped or inclined to permit said fins to turn readily on their attaching bolts, and also to avoid any mud collecting space between the fins and the walls of the compartment therefor when the fins are turned inwardly. Of course, it is not essential that the fins should at all times be carried in the wheels. They may instead be detachably engaged thereto, as illustrated in Fig. 25, in which fins 98, are detachably connected on the outer side of the wheel only, said fins in this instance each being provided with a plurality of tubular studs 99 and 100, on the inner face thereof, adapted to extend through suitable seats in the wheel and bolts 101, extend through suitable webs 102, in said tubular studs and are threaded into conical expansion nuts 103, which engage in the ends of the said tubular studs and act to jam the same firmly in place in the seats therefor in the wheel. Of course, these fins may be quickly removed by the removal of the bolts, and may be carried in any convenient manner in the car.

Inasmuch as the vehicle is intended for regions in which the roads may be very bad or in which no roads at all may exist, and in which supplies may be hard to obtain, and, inasmuch as durability and freedom from delay is an important consideration, cushion or solid tires 104, will be preferable, though not necessarily used. When afloat, a rudder is not required, inasmuch as the front propelling wheels may serve every purpose for steering afloat, as when on land.

Independent screw propelling wheels are shown. For this purpose, twin screws may be employed or a single screw, in part dependent upon the size of the device and the speed to be attained. Where twin screw propellers are employed, the shafts 105 and 106, are journaled at their forward end in a bulkhead 107, and at their rear ends extend through a suitable metallic shaft tunnel 108, through the rear end or stern of the hull or body, and there are provided with propeller wheels 109 and 110, respectively. The friction wheels having long hubs are slidably engaged on said propeller shafts and in the bulkhead 107, and a bar 111 is connected with said hubs at its ends and is connected by means of a rod 112, with a foot lever 113, which projects into convenient position to be actuated by the operator to draw the friction wheels 114 and 115, into engagement with the driven friction wheels 73, as shown in Figs. 5 and 6.

Conveniently and preferably, levers 116, are pivotally engaged upon the bottom of the body or hull, as shown in Figs. 6 and 10, and extend upwardly and are each provided with inwardly directed pins 117, which engage in a groove in the elongated hubs of the friction wheels 114 and 115, and extend well above said shafts to near the top of the bulkhead 107, so that the transverse bar 111, extends quite closely beneath the rear floor 177, in the body, so that the connecting rod 112, whereby said friction wheels are shifted out of, or into engagement with the driving frictions therefor, does not require an aperture through the bulkhead at any point which could permit leakage into the engine compartment therethrough. If desired, the propellers in this construction may be adjustable upwardly or downwardly to permit the same being swung up close under the body when not in use, as shown in Figs. 32 and 33. For this purpose, as shown, a curved outboard bearing 118, is provided for each propeller shaft, each of which is slotted longitudinally, as shown in Fig. 33, and inclines downwardly, rearwardly and outwardly from the under floor at the rear or stern of the body or hull.

The propeller 119, is secured on a short shaft 120, connected with the main propeller shaft by means affording a universal joint, and an outboard bearing block 121, for the short propeller shaft, is slidably engaged on said slotted outboard bearing, and is provided with set screws 122, whereby said bearing block may be secured in its elevated position as shown in Fig. 32, or in propelling position, as shown in Fig. 33. Where a single screw propeller is used, the propeller shaft 123, extends through a shaft tunnel 124, as before described, and is journaled in a bearing 125, at the inner side of the bulkhead 107, as shown in Fig. 17. Said propeller shaft and bearing therefor, of course, lie centrally in the hull. A gear 126, is provided on the inner end of the propeller shaft. A bearing 127, is provided in the floor of the hull in advance thereof, and journaled thereon is an upwardly extended swinging yoke or frame 128, in the top of which and parallel with the propeller shaft 123, is journaled a shaft 129, on the forward end of which is provided a friction wheel 130, and on the rear end of which is provided a pinion 131, which meshes with an idle pinion 132, meshing with the pinion 126, to communicate the drive from the friction wheel 130, to the propeller shaft. Said yoke or frame 128, is provided at its upper end with a worm gear segment 133, and journaled above the same is a short transverse shaft 134, provided with a worm 135, which meshes with said worm gear segment 133, and by the rotation thereof acts to swing the same on said yoke in either direction into engagement with the driving friction 34, on the crank shafts of the engine. Means are provided for rotating said worm and thereby shifting the driving friction disk for said propeller shaft comprising a pinion 136, on said shaft 134, and a rack bar 137, which extends longitudinally the body and over said pinion and is connected with, and actuated by the foot lever 113, before described with reference to the twin screw construction.

A centrifugal or any suitable pump 138, is provided in the hull, as shown in Figs. 6 and 8, and is intended for use as a bilge pump when desired, and may be driven frictionally or in any suitable manner from one of the driving frictions 34, before described. This may also circulate the water for cooling the engine should water be used for this purpose, and may be also employed for hydraulically extending the sectional extension chambers such as shown in Figs. 3, 4, and 26. For this purpose as shown, said air chambers are each provided with a central pressure pipe 140, which pipes telescope into each other, as shown in Fig. 26, and which may be packed in any suitable or convenient manner to render the same watertight or air-tight, if pneumatic pressure be employed. Where hydraulic pressure is used to extend the air tank sections, water taken from outside the hull through a pipe 141ª, passes through two way valves 141ᵇ—141ᶜ, pipes 144—145, pump 138, and then into said telescoping pressure pipe. through a pipe 141, which communicates through a valve 142, and pipe 143, which leads from the pump. When used for a bilge pump, the intake is through the pipe 146, which extends to near the bottom of the hull. The circuit is through the two-way valve 141ᵇ, two-way valve 141ᶜ, pipes 144, 145, to the pump 138, thence through the pipe 143, and four way valve 142, to the overboard discharge pipe 142ᵃ. The extension sections may be forced out pneumatically. For this purpose, the valve 142, and 141ᶜ, are adjusted to connect the overboard discharge pipe as an air intake, with the intake pipes 144—145, and pump 138. The air is delivered from the pump through the pipe 143, and valve 142, to the pipe 141, and thereby forced into the telescoping extension pipes. The air may be released by connecting the pipe 141, with the overboard discharge pipe through the appropriate valve to permit reduction of pressure to the atmosphere. The special lateral air pressure tanks may be connected with the pipe 141, to actuate the extension chambers or may be connected to start the engine with any suitable starting device or used for any of the numerous purposes usual or convenient in the operation of automobiles or boats.

The operation is as follows: When equipped and adjusted for the road, and upon ordinary surfaces, the propelling fins in the wheels are turned and secured inwardly and the extensible sections are retracted, telescoped, folded, collapsed, or in any manner secured within or on the body of the vehicle to reduce the length thereof to the length usual for automobiles of corresponding power and capacity, and the vehicle is operated as is usual with vehicles of the kind. If an air cooled engine is employed, a blast of air may be forced over and around the engine in any suitable manner and by any suitably arranged or disposed fans, and if water cooled, the circulation may be maintained by the pump, as preferred. When so adjusted, entrance to the body of the car is effected by means of the hinged section 26, which may be turned downwardly to afford steps leading to the front and rear seats of the body. When said section on either side of the car is turned downwardly, the steps 29, fall by gravity into operative position, as shown in dotted lines in Fig. 10, and when said section is folded upwardly to closed position, said steps fall by gravity to the position indicated in Fig. 10, in full lines, at which time said steps are entirely retracted and out of the way. The packing secured around said folding section, although unimportant when the vehicle is operated upon the land, insures tight joints when afloat. Should mud be encountered, or should it be necessary to cross soft or swampy land, the wheel fins or paddles 93, or 98, may be adjusted in position. These insure proper propulsion, and being constructed hollow of sheet metal, increase the bearing surface of the wheel and materially assist in sustaining, as well as propelling the car upon soft ground. Inasmuch as all four wheels of the vehicle are driven, the full propulsive effort of the engine is secured and in practice, the car will travel at considerable speed over and on surfaces on which a vehicle driven from the rear wheels only cannot travel at all. Steering also is rendered easy on soft ground from the fact that skidding is eliminated by the use of the paddles or fins and also because of the fact that the front wheels pull the vehicle as well as the rear wheels push the same. Should a body of water such as a stream or lake be encountered that it becomes desirable to cross or on which it is desired to navigate the craft, the fins are adjusted outwardly in the wheels, and the front and rear extensible sections may be adjusted outwardly before the vehicle enters the water, or the vehicle may be driven partly into the water before said sections are adjusted outwardly.

In the pneumatic or hydraulic telescoping extensions illustrated in Figs. 20 and 28 (which, of course, if desired, may be provided on both the front and rear end of the hull or body), the outward adjustment may be effected without leaving the operator's seat, inasmuch as the pump may be started and the sections forced outwardly by hydraulic pressure and when so forced outwardly, inasmuch as liquids are practically incompressible, they are rigidly held in their outward or extended position by the water column contained in the telescoping tube. Of course, should it be desired, separate and independent air chambers may be nested one within the other, substantially as shown in Figs. 8 and 26, excepting that other means may be provided for securing the same in extended position than that herein shown. For instance, a screw shaft may be used for that purpose and this in itself may also be made of extensible sections.

In the stern extensions illustrated in Figs. 1, 3, 4, and 34, to 36 inclusive, the extension chamber may be turned outwardly whether at the bow or stern of the craft and secured in such adjustment, as shown in the drawings, or in any suitable manner. The effect of the longitudinal extension of the hull or body, is, of course, the same howsoever effected; that is to say, it increases the length of the hull, renders the craft much more seaworthy, and much more comfortable for the occupants when afloat. Furthermore, the large increase of the submerged section, owing to such extensions, enormously increases the stability of the craft and reduces draft, the increased buoyancy being, of course, an important factor for safety. The laterally disposed air chambers contained in the fenders and in the downfolding door or hinged section also increase stability, and are of such extent that should the body portion of the vehicle fill with water, these, with the air chambers afforded between the bulkheads and in the extension sections, will be sufficient to support the entire craft with its passengers. Of course, the cellular or double hull construction adds very greatly to strength, stability and buoyancy, owing to the fact that it is possible to secure great strength with comparatively light weight. It is also very important for the reason that should either the inner or outer sheathing of the hull or body be punctured, the other sheathing and the interior reinforcement will always prove sufficient to prevent leakage or danger. Owing to the position of the engine, the center of gravity is maintained at the lowest possible point, and the engine being inclosed between transverse bulkheads, it is protected should leakage occur elsewhere in the craft.

When afloat with the fins or paddles extended, as shown in Figs. 21 or 25, the boat may readily be propelled by the driving wheels alone and a good rate of speed may be maintained thereby. A rudder as such is not necessary, inasmuch as the craft may be readily steered by means of the front wheels, the steering mechanism in that case operating exactly as when the car is operated upon the land. For convenience in steering, the steering staff is located near the center of the craft, so that the operator maintains a central position as is usual when steering a boat, though, of course, this is not essential, and if desired, the steering staff may be located at either side as is common with automobiles. Should greater speed be desired, than is available with the side wheel propulsion before described, the propeller wheels may be brought into operation. To do this with the twin screw drive it is only necessary to shift the foot lever 113, forwardly, thus drawing the driving frictions for the propeller wheel into engagement with the driving frictions for the rear wheels with the effect of driving the boat simultaneously by both the side wheels and propeller wheels. Of course, if equipped with outboard bearing, such as shown in Figs. 32 or 33, the propeller will be adjusted downwardly and the bearing therefor secured in adjusted position, as shown in dotted lines in Fig. 32. Where a single screw is used, the drive may be effected by the side wheels alone, by the single screw alone or by both the side wheels and screw driving simultaneously. This will be evident from the construction described inasmuch as the friction wheel 130, is driven by direct contact with the edge of either the rear driving friction wheels 34, on the crank shaft of the engine, while the side wheels are driven from the same source and said driving mechanisms are each independent of the other and may be used either independently or simultaneously, as preferred. Of course, if it is desired to increase the speed of drive, it is effected by rotating the hand wheel 92, on the steering staff. This shifts the driven friction wheels 73, radially from or toward the center of the driving friction wheels 34, by the rotation of the shaft 84, and the pinions thereon which shift the racks within the lower frame member 69, on which said driven frictions are carried. When it is desired to use the craft as a boat, it may sometimes be desirable to raise or elevate the wheels on the body somewhat, so that the wheels will not be too deeply submerged to afford an effective drive. For this purpose hooked bolts 160, threaded at their lower ends are engaged in suitable eyes on the body above each axle and the lower threaded ends thereof are connected by means of a metal strap extending beneath the axle and adapted to be adjusted upwardly by means of suitable nuts. By this means any desired compression on the springs may be secured to elevate the wheels materially with reference to the body. Such supporting clamps may be quickly removed upon landing or quickly applied preparatory to going afloat.

Of course, while we have described the particular driving connections for the front wheels as illustrated in Fig. 21, it is to be understood that the driving connections for the rear wheels are substantially the same with the exception that the spindle or stub 39, in that case may be integral with the axle, inasmuch as it is not necessary to steer with the rear wheels, and the steering knuckle is therefore not required. Otherwise the constructions are identical in all respects.

While we have particularly described the extensible sections embodied in our invention, it is to be understood that we do not purpose limiting ourselves to any particular or specific method of increasing the length of, or extending the hull or body when used as a boat, or reducing the length when used as an automobile, nor do we purpose limiting the construction to the particular driving connections herein shown and described. It is obvious that the particular construction whereby a four wheel drive is secured in connection with an engine such as embodied herein, is but one of numerous constructions and arrangements for attaining the end sought, and it is evident that, if desired, the driving connections for the front and rear automobile wheels may be provided whereby the wheels on one side of the car may be driven ahead while those on the other are reversed. This, while unimportant for land use, would facilitate turning upon the water. Also, it is evident that any rudder may be employed if thought desirable. Inasmuch, however, as the steering can readily be effected by means of the front wheels as hereinabove described, such a rudder is not shown or described.

We have attempted to show in simple and practical form, a construction adapted for military use and the use of the hunter and the pleasure seeker in the wilderness, and to afford a construction capable of use wheresoever the operator might desire to go, whether on land or afloat. Numerous details of the construction may, of course, be varied without departing from the principles of this invention. We therefore do not purpose limiting this application for patent otherwise than necessitated by the prior art.

We claim as our invention:

1. In a device of the class described an automobile having a water-tight body thereon, longitudinally adjustable telescoping air tanks connected with said body, an engine and transmission in said body, said engine and transmission being positioned near the longitudinal center of the body and mostly below load water line when afloat.

2. In a device of the class described an automobile having a water-tight body thereon, longitudinally adjustable telescoping tanks connected with one end of said body, an adjustable air tank hingedly connected with the other end of said body, an engine and transmission positioned in and near the longitudinal center of the body and a transverse bulkhead at the front and the rear of the engine.

3. In a device of the class described an automobile having a water-tight body thereon, telescoping sections carried by said body adapted to be extended to increase the length of the same, an engine and transmission positioned in and near the longitudinal center of the body and means actuated thereby to extend the telescoping sections.

4. A land and water vehicle embracing the running gear of an automobile, a water tight body thereon serving as a hull when afloat, hydraulically operated extensible sections inclosed thereby, operating machinery in said body or hull positioned centrally and substantially below the water line, and means for propelling the vehicle when on land and when afloat.

5. A land and water vehicle embracing an automobile, a water tight body serving as a hull when afloat, pressure operated extensible sections thereon, operating mechanism in said body or hull positioned centrally below the water line, and propelling means driven thereby.

6. A land and water vehicle embracing a running gear, a water tight body thereon serving as a hull when afloat, means movable longitudinally of the vehicle for increasing the length thereof for greater displacement when in the water, operating machinery in said body or hull positioned centrally below the water line, and propelling fins on the wheels of the running gear.

7. A machine of the class described embracing a water tight extensible body adapted to be extended axially and longitudinally, means sustaining the body in extended position, and mechanism for propelling the vehicle on land and water.

8. A machine of the class described embracing an automobile having a water tight body affording a boat, means extending the body axially by pressure, paddles on each automobile wheel for propelling the machine, and means for elevating the wheels relatively the body preparatory to going afloat.

9. In a land and water vehicle an extensible interfitting sectional water tight body or hull, driving wheels supporting the same, paddles collapsible into and extensible transversely said wheels, transverse water tight bulkheads at each end of said body, axles for said wheels extending therethrough, and means for adjusting said axles to a higher position relative said body for use in water.

10. In a land and water vehicle an extensible water tight body or hull, automobile driving and steering wheels supporting the same, paddles carried in each of said wheels and extensible transversely thereof and collapsible into the wheels, driving means connected with said wheels, and propelling means for use in water in addition to said wheels, said propelling means and said wheels both adjustable relative the body to facilitate operation of the device when on land and water respectively.

11. A land and water vehicle embracing an automobile constructed for land use, a boat-like body thereon, an engine and transmission devices in said body, independent driving connections to each of said wheels of the automobile, bulkheads in advance of and at the rear of the engine, and telescoping means for varying the length of said body or hull.

12. A land and water vehicle embracing an automobile constructed for land use, a boat-like body thereon, an engine and transmission devices in said body, independent driving connections to each of said wheels of the automobile, transverse water-tight bulkheads in advance of and at the rear of the engine, means for varying the length of said body and means supporting the wheels in elevated position on the body when afloat without disconnecting the drive therefrom.

13. A land and water vehicle embracing an automobile constructed for land use, a boat-like body thereon, an engine and transmission devices positioned centrally in said body, independent driving connections to each of said wheels of the automobile, bulkheads in advance of and at the rear of the engine, and collapsible air chambers or tanks adjustable to lengthen said body.

14. In a land and water vehicle a boat-like body and telescoping members adapted to be expanded when going afloat to increase the displacement of said body.

15. In a land and water vehicle a boat-like body and collapsible interfitting air tanks adjustable to extend the length of said vehicle.

16. In a land and water vehicle a boat-like body and interfitting air tanks adjustable to extend the length of the body when going afloat.

17. A land and water vehicle embracing an automobile having a boat-like body, interfitting air chambers or tanks carried on the front and rear of said body and adapted to extend the length of the body going afloat.

18. A land and water vehicle embracing an automobile having a boat-like body, telescoping air chambers or tanks carried on one end of said body and adjustable to extend the length of the body when going afloat.

19. A land and water vehicle embracing an automobile having a boat-like body, interfitting air chambers or tanks carried on one end of said body and adjustable to extend the length of the body when going afloat.

20. In a land and water vehicle a water-tight body constructed of reinforced sheet metal, an engine and transmission positioned centrally in said body, means operated thereby for propelling the device on land and afloat, and extensible air chambers at each end of said body adapted to increase the length thereof when the vehicle is used upon the water.

21. In a land and water vehicle a water-tight body constructed of reinforced sheet metal, propelling wheels thereon, an engine and transmission in said body and driving said propelling wheels, and one or more chambers at each end of said body adjustable one within the other to increase the length of the body when used upon the water.

22. In a land and water vehicle propelling wheels, a water-tight body constructed of reinforced sheet metal mounted thereon, an engine and transmission positioned centrally in said body and driving to said wheels, extensible chambers or tanks at each end of said body adapted to vary the length thereof, and steering means acting on the propelling wheels.

23. In a machine of the class described a boat-like body, automobile wheels supporting the same, fins or paddles on the wheels for use in mud or water, an engine positioned centrally in the body, a transmission driving from said engine to each of the automobile wheels independently, extensible forward and after air chambers or tanks adapted to materially extend the length of the body, and a plurality of laterally disposed air chambers or tanks.

24. In a machine of the class described a boat-like body, automobile wheels supporting the same, fins or paddles adjustable on the wheels for use in mud or water, an engine positioned centrally in the body, a transmission driving from said engine to each of the automobile wheels independently, adjustable forward and after air chambers or tanks adapted to materially extend the length of the body, and a plurality of laterally disposed air chambers, some of the same acting as mud and spray guards for the wheels.

25. In a machine of the class described a boat-like body, automobile wheels supporting the same, fins or paddles on the wheels for use in mud and in water, an engine positioned centrally in the body, a transmission driving from said engine to each of said wheels independently, a forward and after air chamber adjustable to materially extend the length of the body, a plurality of laterally disposed air chambers or tanks, some acting as spray and mud guards and transverse water-tight bulkheads in said body.

26. In a device of the class described a double sheathed body or hull having air spaces between sheathings, forward and after air chambers, or tanks extensibly carried thereon and acting to vary the length of the body, lateral tanks forming spray and mud guards and propelling means for said body or hull.

27. In a device of the class described a body or hull, forward and after air chambers or tanks extensibly carried thereon and acting to vary the length of the body, some of said tanks collapsing into each other when retracted.

28. In a device of the class described a body or hull, embracing an outer and an inner sheathing, air chambers therebetween, forward and after air chambers or tanks adjustably carried thereon and acting to vary the length of the body, and a plurality of laterally disposed air tanks, some of which act also as spray and mud guards.

29. A device of the class described embracing a water-tight boat-like body, centrally disposed engine and transmission devices therein positioned below the water line, air chambers or tanks carried on said body at each end thereof and adapted to increase the length thereof when afloat, laterally disposed outer air chambers or tanks, and transverse bulkheads in said body or hull dividing the same into water-tight compartments.

30. A device of the class described embracing a water-tight boat-like body, centrally disposed engine and transmission devices therein positioned substantially below the water line, air chambers carried on said body at each end thereof and adjustable to increase the length thereof when afloat, laterally disposed outer air chambers or tanks and transverse bulkheads in said body or hull dividing the same into a plurality of water-tight compartments, and automobile wheels on said body for propelling the same on land and water.

31. A combined land and water vehicle of the class described embracing a body or hull having an outer and an inner sheet metal lining, skin or sheathing, and a reinforcing lining between the same affording a plurality of independent air chambers which extend transversely of the hull.

32. A combined land and water vehicle of the class described embracing a body having an outer and an inner lining, skin or sheathing, one of which is of sheet metal, and a reinforcing lining between the inner and the outer sheathing affording closely arranged substantially parallel air chambers which extend transversely of the body.

33. A combined land and water vehicle of the class described embracing a body having an outer and an inner water-tight lining, skin or sheathing, and a reinforcing lining of corrugated metal between the inner and the outer sheathing and affording air chambers which extend transversely of the body.

34. A combined land and water vehicle of the class described embracing a water-tight extensible body having an inner and an outer sheet metal sheathing and reinforcing material between the inner and outer sheathing affording a plurality of independent air chambers extending transversely of the body.

35. A hull or body for land and water vehicle embracing a water-tight body having an inner and an outer sheathing, one of which is of sheet metal, reinforcing material between the inner and outer sheathing affording a plurality of independent air chambers between the sheathings which extend transversely of the hull and air tight extensions adapted to be folded into the body and adapted to extend the hull in one dimension when afloat.

36. A water-tight hull or body for a land and water craft, and an air tank adapted to be folded into the body and adjustable to extend the body in one direction when afloat.

37. A device of the class described embracing a boat-like body, automobile wheels for propelling the same upon the land and in the water, operative means for elevating and supporting said wheels on the body when the vehicle is to go afloat, and an adjustable air tank hingedly connected to the rear of the body and adapted to be folded onto the same.

38. A device of the class described embracing a boat-like body, automobile wheels for propelling the same upon the land and in the water, means elevating and supporting said wheels on the body when the vehicle is to go afloat, and an adjustable air tank hingedly connected to the rear end of the body adapted to be folded onto the same and to extend the same rearwardly when unfolded, said air tank when extended having a substantially flat undersurface.

39. In a device of the class described a watertight body of boat-like form, an engine therein, automobile wheels supporting the body, means for raising the wheels relatively the body when the device is to go afloat, adjustable fins or paddles on each wheel to afford a side wheel drive for the boat, and independent connections with the engine to drive all said wheels.

40. In a device of the class described a watertight longitudinally extensible body of boat-like form, an engine therein, automobile wheels supporting the body, means for raising the wheels relatively the body when the device is to go afloat, fins or paddles adjustable on each wheel to afford a four side wheel drive for the boat, and independent connections to drive all said wheels, and one or more propeller wheels also driven from said engine.

41. A combined automobile and boat embracing a body or hull, forward and aft extensible members carried thereon, a motor in the body, automobile wheels, two at each side of the body and driven from said motor, fins or paddles adjustable on said wheels, independent driving connections for each of said wheels, and means for turning one pair of said wheels out of their plane to steer the device on land and in the water.

42. A device of the class described embracing automobile axles and wheels thereon, paddles in each wheel adjustable outwardly for propelling purposes, a watertight boat-like body supported on said wheels, means raising the axles relatively to the body, a steering mechanism for the front wheels, a propeller wheel driven from a part of the transmission for operating one of the automobile wheels, and means for varying the length of the body to suit its use on land or water.

43. A land and water vehicle embracing a body, wheels supporting the same for use upon the land, a propeller for driving the same in the water, and an air chamber hinged at one end of the body and adapted to be extended to increase the length of the body.

44. A land and water vehicle embracing a body, wheels supporting the same for use upon the land, a propeller for driving the same in the water, and an air chamber shaped to afford the end of a boat and hinged at one end of the body and adapted to increase the length of the craft when afloat.

45. A land and water vehicle embracing a body, wheels supporting the same for use upon the land and adapted to propel when afloat, an additional propeller for driving the craft in the water, and extensible ends foldable one within the other on said body adapted when extended to complete the boat shape.

46. A land and water vehicle embracing wheels to propel the device upon the land and in the water, a water-tight body supported on said wheels, propeller wheels, longitudinally extensible telescoping air chambers adapted to extend the length of the body and lateral air chambers on said body, one or more of said lateral chambers being also movable.

47. A land and water vehicle embracing wheels to propel and steer the device upon the land and in the water, said wheels adapted to be adjusted vertically and independently of one another, a body supported on said wheels, a floor therein normally above water line when afloat, and a motor and transmission mechanism below said floor and connected to drive the wheels.

48. A land and water vehicle embracing wheels to propel the device upon land and in the water, a body supported on said wheels, a floor in said body above the water line, a motor and driving connections below said floor for propelling said wheels, and a plurality of air tanks adapted to be folded one within the other and connected with the body to float the same.

49. A land and water vehicle embracing a cellular boat-like body, automobile wheels supporting the same and acting to propel the same both on the land and in the water, means for supporting and elevating said wheels on the body, when the craft is afloat, propeller shafts projecting through the rear of the body, a propeller on each of said shafts, an engine positioned in said body, a transmission driving from said engine to each of the automobile wheels and propellers independently, and means operating on some of the automobile wheels for steering when afloat.

50. A land and water vehicle embracing a boat-like body, a motor therein, two front and two rear driving wheels thereon, and automobile wheels supporting the body and each driven by the corresponding driving wheel on the motor to propel the vehicle both on the land and in the water.

51. A land and water vehicle embracing a boat-like body, an engine therein, two rearwardly and two forwardly facing driving wheels thereon, automobile wheels supporting the body and acting to propel the same both on the land and in the water, an independent transmission device for each of the front wheels and for each of the rear wheels, said transmission devices operatively connecting each automobile wheel with one of the driving wheels on the engine.

52. A device of the class described comprising a boat-like body, an engine therein, four driving wheels thereon, automobile wheels to support and propel the vehicle upon the land, propelling means therefor when in the water, and frictional transmission devices whereby each automobile wheel is driven independently by one of the engine driving wheels.

53. A device of the class described comprising a body, automobile paddle wheels for supporting and propelling the same upon the land and in the water, a central ignition hydro-carbon engine in the body, parallel crank shafts thereon, a friction disk on each end of each crank shaft and facing the end of the vehicle, and friction connections for driving each automobile wheel by one of said friction disks.

54. A device adapted to travel on land and water embracing a water-tight body and propelling means both at the sides thereof and at the rear of the same, one or more of said side propelling means capable of being turned out of their planes to steer the craft, and mechanism for driving said propelling means.

55. In a device of the class described an extensible water-tight body and propelling means both at the sides thereof and at the rear of the same, some of said side propelling means capable of being turned out of their planes to steer the craft and a motor connected to actuate the side and rear propelling means independently or simultaneously.

56. In a land and water craft a water-tight body, adjustable air tanks for varying the length thereof, propelling means both at the sides thereof and at the rear of the same, mechanism for actuating some of said propelling means to steer the craft, a motor, and a plurality of driving disks actuated thereby and connected to actuate the propelling wheels individually.

57. A land and water craft embracing a body, fixed air chambers therein and thereon sufficient to float the same, movable air chambers at one or both ends thereof to increase longitudinal stability, and fluid actuating means for adjusting some of the movable air chambers in extended position, propelling means, and an engine and transmission therefor positioned below load water line in said body.

58. In a device of the class described a body provided with air chambers sufficient to float the same, movable air chambers at one or both ends thereof to increase longitudinal stability, and pressure exerting means for extending and securing the same in extended position, propelling means, and an engine and transmission therefor positioned below normal load water line in said body.

59. In a device of the class described a body provided with interfitting air chambers sufficient to float the same, movable air chambers at one or both ends thereof to increase longitudinal stability, means securing the same in extended position, propelling means, an engine and transmission therefor positioned in said body below the normal water line, and a floor over said engine and above the water line.

60. In a device of the class described a water-tight body capable of serving as a boat, automobile wheels on each side thereof, an engine in the bottom of said boat and near the center thereof, and embracing oppositely acting pistons, parallel crank shafts extending longitudinally of the body, a friction drive wheel on each end of each crank shaft, and friction wheels positioned to engage therewith and each connected to drive individually one of the automobile wheels, thereby affording an independent drive for each wheel.

61. In a device of the class described a boat-like body, automobile wheels on each side thereof, retractable paddles thereon, a central ignition engine in the bottom and near the center of said boat, and embracing parallel simultaneously driven longitudinal crank shafts, a friction drive wheel on each end of each crank shaft, transmission friction driving wheels positioned to adjustably engage each of the drive wheels on the crank shaft and each connected to drive individually one of the automobile wheels, and a screw propeller also driven thereby.

62. In a device of the class described a boat-like body, automobile wheels on each side thereof, an engine in the bottom and near the center of said boat, parallel, longitudinally extending crank shafts thereon, a driving wheel on each end of each crank shaft, movable transmission driving wheels positioned to engage therewith and each connected to drive individually one of the automobile wheels, and one or more screw propellers and means for adjusting the same into driving relation with any of said driving elements.

63. An automobile construction to float, means lifting the wheels on the body, retractable paddles on said wheels, means driving the same and means adapted to turn some of the paddle wheels out of their plane to steer the craft when afloat.

64. In a device of the class described, a body, an engine positioned about the middle thereof, and affording four driving disks, two directed forwardly and two rearwardly, automobile wheels driven therefrom, a propeller and shaft journaled centrally in the body and extending to the rear end thereof, a friction wheel on the inner end of said propeller shaft, and means bringing said friction wheel into and out of engagement with either of the driving friction wheels on the engine shafts, and independently of the drive of the automobile wheels.

65. In a device of the class described, a body, an engine positioned at about the middle thereof, a plurality of friction disks driven by said engine, automobile wheels individually driven therefrom, a screw propeller and shaft journaled centrally in the body and extending through the rear end thereof, a friction wheel or wheels on the inner end of said propeller shaft, and means swinging said friction wheel or wheels into and out of engagement with the driving friction wheels on the engine shaft, and independently of the drive of the automobile wheels.

66. In a device of the class described, a body, an engine positioned centrally and below the load water-line, four friction disks driven thereby, two in advance thereof and two in the rear of the same, automobile paddle wheels driven individually therefrom, a propeller and shaft journaled centrally in the body and extending through the rear end thereof, a friction wheel on the inner end of said propeller shaft, means swinging said friction wheels into and out of engagement with either of the rear driving friction wheels on the engine shaft and independently of the drive of the automobile paddle wheels, and steering means on the body.

67. In a device of the class described a driven automobile wheel and mud and water propelling fins retractable therein, means turning said wheel for steering, and mechanism adapted to elevate the wheel without disconnecting the drive therefrom, said wheels capable of being driven in elevated position for use in water when afloat.

68. In a combined land and water craft of the class described a hull or body, vertically adjustable side paddle wheels, and a centrally disposed steering mechanism acting to turn some of the side paddle wheels out of their planes.

69. In a device of the class described embracing a body and automobile wheels supporting the same, paddles retractable therein to afford a plain unbroken surface and a centrally disposed steering mechanism acting on said wheels to turn one or more thereof out of their planes.

70. In a combined land and water vehicle of the class described a body, extensible air tanks carried thereon and hydrostatic means for extending the same to operative position.

71. A combined land and water craft of the class described embracing a body, adjustable air tanks carried thereon, hydrostatic means for extending the same to increase one dimension of the body, and means releasing the pressure.

72. In a device of the class described a body, extensible air sections carried thereon to vary the length thereof, a pump and connection therewith for actuating said sections by fluid pressure and also for operating the pump as a bilge pump.

73. In a device of the class described an automobile embracing paddle wheels adapted to propel the same on the land or in water, a body or hull comprising an outer and inner sheathing of sheet metal and an inner reinforcing member, extensible sections carried on the body to vary the length thereof, transverse bulkheads arranged at a plurality of points in the length of the body to prevent leakage, and a pump installed for use as a bilge and as a pressure pump to extend the extensible sections.

74. In a device of the class described an automobile embracing paddle wheels adapted to propel the same on the land, in mud or in water, a boat-like body or hull adjustably supported thereon and means adapted to turn some of the supporting paddle wheels out of their plane to steer the craft.

75. In a device of the class described an automobile embracing paddle wheels adapted to propel the same on the land, in mud or in water, a boat-like body or hull adjustably supported thereon, means adjusting the hull up or down on said wheels, means for increasing the buoyancy of the body when going afloat and means adapted to turn some of the supporting paddle wheels out of their normal plane to steer the craft.

76. In a combined boat and automobile embracing a body comprising telescoping sections, said body adjustable to increase the displacement thereof to suit the requirements of the medium upon which it is to travel.

77. An automobile boat and mud and spray guards projecting over the upper periphery of the wheels and comprising each an air or gas tank.

78. An automobile and boat comprising a body or hull, automobile wheels all independently driven, means for adjusting the body or hull up or down relative thereto, adjustable paddles in each wheel, and a substantially flat bottomed air tank affording a rear extension adjustable outwardly to increase the after stability when afloat.

79. An automobile and boat comprising a body or hull, automobile wheels all independently driven, means for adjusting the body or hull up or down relative thereto, adjustable paddles in each wheeel, a substantially flat bottomed air tank affording a rear extension adjustable outwardly to increase the after stability when afloat, and one or more positively driven screw propellers extending beneath said extension.

80. In a combined automobile and boat, a boat-like body, transverse bulkheads therein, a transverse water compartment near each end of the body and opening laterally through the body, the automobile axles therein, springs supporting the body thereon, and means acting to draw the axles upwardly and support the same high in said compartments preparatory to going afloat.

81. In a combined automobile and boat, a boat-like body, transverse bulkheads therein, two of which are arranged close together near each end of the body affording a narrow open ended transverse compartment therebetween, an axle, and the springs on which the body is supported in each, and means for adjusting the axles upwardly in the body preparatory to going into the water.

In testimony whereof we have hereunto subscribed our names in the presence of two subscribing witnesses.

ALBERT E. COOK.
THOS. VAN TUYL.

Witnesses:
S. D. MOSER,
R. W. SAYRE.